US008890773B1

(12) United States Patent
Pederson

(10) Patent No.: US 8,890,773 B1
(45) Date of Patent: Nov. 18, 2014

(54) VISIBLE LIGHT TRANSCEIVER GLASSES

(75) Inventor: John C. Pederson, St. Cloud, MN (US)

(73) Assignee: Federal Law Enforcement Development Services, Inc., St. Cloud, MN (US)

(*) Notice: Subject to any disclaimer, the term of this patent is extended or adjusted under 35 U.S.C. 154(b) by 173 days.

(21) Appl. No.: 12/750,796

(22) Filed: Mar. 31, 2010

Related U.S. Application Data

(60) Provisional application No. 61/165,546, filed on Apr. 1, 2009.

(51) Int. Cl.
G09G 5/00 (2006.01)

(52) U.S. Cl.
USPC .............................................................. 345/8

(58) Field of Classification Search
CPC ............................. G09G 5/00; G06Q 20/145
USPC .............................................. 345/8; 348/158
See application file for complete search history.

(56) References Cited

U.S. PATENT DOCUMENTS

| | | |
|---|---|---|
| 700,678 A | 5/1902 | Downie |
| 2,082,279 A | 6/1937 | Fore |
| 3,469,686 A | 9/1969 | Gutsche et al. |
| 3,701,043 A | 10/1972 | Zuleeg et al. |
| 3,705,316 A | 12/1972 | Burrous et al. |
| 3,863,075 A | 1/1975 | Ironmonger et al. |
| 3,867,718 A | 2/1975 | Moe |
| 3,889,147 A | 6/1975 | Groves |
| 3,911,430 A | 10/1975 | Jankowski et al. |
| 4,149,111 A | 4/1979 | Coates, Jr. |
| 4,243,985 A | 1/1981 | Quayle |
| 4,254,453 A | 3/1981 | Mouyard et al. |
| 4,271,408 A | 6/1981 | Teshima et al. |
| 4,301,461 A | 11/1981 | Asano |
| 4,319,306 A | 3/1982 | Stanuch |

(Continued)

FOREIGN PATENT DOCUMENTS

| | | |
|---|---|---|
| AU | 2006201345 | 10/2007 |
| AU | 2007202909 | 2/2008 |

(Continued)

OTHER PUBLICATIONS

Akhavan et al., "High-Speed Power-Efficient Indoor Wireless Infrared Communication Using Code Combining-Part I," IEEE Trnsactions on Communications, vol. 50, No. 7, Jul. 2002, pp. 1098-1109.

(Continued)

Primary Examiner — Tony N Ngo
(74) Attorney, Agent, or Firm — Vidas, Arrett & Steinkraus, P.A.

(57) ABSTRACT

An LED light and communication system includes Visible Light Communication Transceiver Glasses having at least one projector, lense(s), and optical transceiver, the optical transceiver including a light support and a processor. The light support has at least one light emitting diode and at least one photodetector attached. The processor is in communication with the at least one light emitting diode and the at least one photodetector. The processor is capable of illuminating the at least one light emitting diode to create at least one light signal which is not observable to the unaided eyes of an individual. The second light signal includes at least one data packet. The processor may generate a signal for the projector to display information on the lense(s).

14 Claims, 4 Drawing Sheets

(56) References Cited

U.S. PATENT DOCUMENTS

| | | |
|---|---|---|
| 4,336,580 A | 6/1982 | Mouyard et al. |
| 4,342,944 A | 8/1982 | SpringThorpe |
| 4,368,979 A | 1/1983 | Ruell |
| 4,390,931 A | 6/1983 | Gorick et al. |
| 4,434,510 A | 2/1984 | Lemelson |
| 4,445,132 A | 4/1984 | Ichikawa et al. |
| 4,556,862 A | 12/1985 | Meinershagen |
| 4,595,904 A | 6/1986 | Gosswiller |
| 4,598,198 A | 7/1986 | Fayfield |
| 4,614,866 A | 9/1986 | Liss et al. |
| 4,615,131 A | 10/1986 | Wakatake |
| 4,616,225 A | 10/1986 | Woudenberg |
| 4,630,180 A | 12/1986 | Muraki et al. |
| 4,630,183 A | 12/1986 | Fujita |
| 4,633,280 A | 12/1986 | Takasu |
| 4,654,629 A | 3/1987 | Bezos et al. |
| 4,703,219 A | 10/1987 | Mesquida |
| 4,710,977 A | 12/1987 | Lemelson |
| 4,716,296 A | 12/1987 | Bussiere et al. |
| 4,720,835 A | 1/1988 | Akiba et al. |
| 4,724,312 A | 2/1988 | Snaper |
| 4,742,432 A | 5/1988 | Thillays et al. |
| 4,799,135 A | 1/1989 | Inukai et al. |
| 4,821,118 A | 4/1989 | Lafreniere |
| 4,821,338 A | 4/1989 | Naruse et al. |
| 4,868,719 A | 9/1989 | Kouchi et al. |
| 4,900,970 A | 2/1990 | Ando |
| 4,918,497 A | 4/1990 | Edmond |
| 4,928,084 A | 5/1990 | Reiser |
| 4,929,866 A | 5/1990 | Murata et al. |
| 4,935,665 A | 6/1990 | Murata |
| 4,949,866 A | 8/1990 | Sanders |
| 4,954,822 A | 9/1990 | Borenstein |
| 4,965,644 A | 10/1990 | Kawabata et al. |
| 4,966,862 A | 10/1990 | Edmond |
| 4,975,644 A | 12/1990 | Fox |
| 4,975,814 A | 12/1990 | Schairer |
| 4,990,970 A | 2/1991 | Fuller |
| 5,000,569 A | 3/1991 | Nylund |
| 5,027,168 A | 6/1991 | Edmond |
| 5,035,055 A | 7/1991 | McCullough |
| 5,038,406 A | 8/1991 | Titterton et al. |
| 5,041,947 A | 8/1991 | Yuen et al. |
| 5,045,767 A | 9/1991 | Wakatake |
| 5,050,055 A | 9/1991 | Lindsay et al. |
| 5,057,828 A | 10/1991 | Rousseau |
| 5,060,303 A | 10/1991 | Wilmoth |
| 5,062,152 A | 10/1991 | Faulkner |
| 5,067,788 A | 11/1991 | Jannson et al. |
| 5,091,828 A | 2/1992 | Jincks et al. |
| D324,921 S | 3/1992 | Stanuch et al. |
| 5,093,768 A | 3/1992 | Ohe |
| 5,097,397 A | 3/1992 | Stanuch et al. |
| 5,097,612 A | 3/1992 | Williams |
| 5,101,326 A | 3/1992 | Roney |
| 5,122,943 A | 6/1992 | Pugh |
| 5,136,287 A | 8/1992 | Borenstein |
| 5,159,486 A | 10/1992 | Webb |
| 5,164,992 A | 11/1992 | Turk et al. |
| 5,172,113 A | 12/1992 | Hamer |
| 5,182,647 A | 1/1993 | Chang |
| 5,187,547 A | 2/1993 | Niina et al. |
| 5,193,201 A | 3/1993 | Tymes |
| 5,198,746 A | 3/1993 | Gyugyi et al. |
| 5,198,756 A | 3/1993 | Jenkins et al. |
| 5,220,235 A | 6/1993 | Wakimizu et al. |
| 5,224,773 A | 7/1993 | Arimura |
| 5,233,204 A | 8/1993 | Fletcher et al. |
| 5,235,498 A | 8/1993 | Van Dulmen et al. |
| 5,283,425 A | 2/1994 | Imamura |
| 5,291,196 A | 3/1994 | Defour |
| 5,296,840 A | 3/1994 | Gieffers |
| 5,298,738 A | 3/1994 | Gebert et al. |
| 5,302,965 A | 4/1994 | Belcher et al. |
| 5,313,187 A | 5/1994 | Choi et al. |
| 5,321,593 A | 6/1994 | Moates |
| 5,357,123 A | 10/1994 | Sugawara |
| 5,357,409 A | 10/1994 | Glatt |
| 5,359,255 A | 10/1994 | Kawai et al. |
| 5,359,669 A | 10/1994 | Shanley et al. |
| 5,361,190 A | 11/1994 | Roberts et al. |
| 5,362,971 A | 11/1994 | McMahon et al. |
| 5,381,155 A | 1/1995 | Gerber |
| 5,400,140 A | 3/1995 | Johnston |
| 5,401,328 A | 3/1995 | Schmitz |
| 5,403,916 A | 4/1995 | Watanabe et al. |
| 5,406,095 A | 4/1995 | Koyama et al. |
| 5,410,328 A | 4/1995 | Yoksza et al. |
| 5,410,453 A | 4/1995 | Ruskouski |
| 5,416,627 A | 5/1995 | Wilmoth |
| 5,419,065 A | 5/1995 | Lin |
| 5,420,444 A | 5/1995 | Sawase et al. |
| 5,422,623 A | 6/1995 | Bader et al. |
| 5,426,417 A | 6/1995 | Stanuch |
| 5,434,693 A | 7/1995 | Tanaka et al. |
| 5,436,809 A | 7/1995 | Brassier et al. |
| 5,450,301 A | 9/1995 | Waltz et al. |
| 5,453,729 A | 9/1995 | Chu |
| 5,465,142 A | 11/1995 | Krumes et al. |
| 5,471,371 A | 11/1995 | Koppolu et al. |
| 5,475,241 A | 12/1995 | Harrah et al. |
| 5,482,896 A | 1/1996 | Tang |
| 5,490,048 A | 2/1996 | Brassier et al. |
| 5,490,049 A | 2/1996 | Montalan et al. |
| 5,491,350 A | 2/1996 | Unno et al. |
| 5,498,883 A | 3/1996 | Lebby et al. |
| 5,514,627 A | 5/1996 | Lowery et al. |
| 5,516,727 A | 5/1996 | Broom |
| 5,519,720 A | 5/1996 | Hirano et al. |
| 5,526,237 A | 6/1996 | Davenport et al. |
| 5,528,474 A | 6/1996 | Roney et al. |
| 5,532,472 A | 7/1996 | Furuta |
| 5,546,219 A | 8/1996 | Iida |
| 5,546,496 A | 8/1996 | Kimoto et al. |
| 5,552,780 A | 9/1996 | Knockeart |
| 5,557,257 A | 9/1996 | Gieffers |
| 5,567,036 A | 10/1996 | Theobald et al. |
| 5,568,406 A | 10/1996 | Gerber |
| 5,569,939 A | 10/1996 | Choi |
| 5,575,459 A | 11/1996 | Anderson |
| 5,580,156 A | 12/1996 | Suzuki et al. |
| 5,585,783 A | 12/1996 | Hall |
| 5,593,223 A | 1/1997 | Koizumi |
| 5,593,459 A | 1/1997 | Gamblin |
| 5,594,415 A | 1/1997 | Ishikawa et al. |
| 5,598,290 A | 1/1997 | Tanaka et al. |
| 5,604,480 A | 2/1997 | Lamparter |
| 5,606,444 A | 2/1997 | Johnson et al. |
| 5,607,788 A | 3/1997 | Tomazic |
| 5,612,201 A | 3/1997 | De Plaen et al. |
| 5,612,231 A | 3/1997 | Holm et al. |
| 5,625,201 A | 4/1997 | Holm et al. |
| 5,627,851 A | 5/1997 | Takahashi |
| 5,631,474 A | 5/1997 | Saitoh |
| 5,632,551 A | 5/1997 | Roney et al. |
| 5,633,629 A | 5/1997 | Hochstein |
| 5,634,287 A | 6/1997 | Lamparter |
| 5,634,357 A | 6/1997 | Nutter |
| 5,634,711 A | 6/1997 | Kennedy et al. |
| 5,635,902 A | 6/1997 | Hochstein |
| 5,635,981 A | 6/1997 | Ribacoff |
| 5,636,916 A | 6/1997 | Sokolowski |
| 5,644,291 A | 7/1997 | Jozwik |
| 5,649,002 A | 7/1997 | Nutter et al. |
| 5,656,829 A | 8/1997 | Sakaguchi et al. |
| 5,660,461 A | 8/1997 | Ignatius et al. |
| 5,661,645 A | 8/1997 | Hochstein |
| 5,661,742 A | 8/1997 | Huang |
| 5,664,448 A | 9/1997 | Swan et al. |
| 5,674,000 A | 10/1997 | Kalley |
| 5,694,112 A | 12/1997 | VannRox et al. |
| 5,696,500 A | 12/1997 | Diem |
| 5,697,175 A | 12/1997 | Schwartz |
| 5,705,047 A | 1/1998 | Lee |

(56) References Cited

U.S. PATENT DOCUMENTS

| | | |
|---|---|---|
| 5,707,891 A | 1/1998 | Izumi et al. |
| 5,708,428 A | 1/1998 | Phillips |
| 5,722,760 A | 3/1998 | Chien |
| 5,726,535 A | 3/1998 | Yan |
| 5,726,786 A | 3/1998 | Heflinger |
| 5,734,337 A | 3/1998 | Kupersmit |
| 5,734,343 A | 3/1998 | Urbish et al. |
| 5,736,925 A | 4/1998 | Knauff et al. |
| 5,739,552 A | 4/1998 | Kimura et al. |
| 5,739,592 A | 4/1998 | Rigsby et al. |
| 5,758,947 A | 6/1998 | Glatt |
| 5,760,531 A | 6/1998 | Pederson |
| 5,781,105 A | 7/1998 | Bitar et al. |
| 5,785,418 A | 7/1998 | Hochstein |
| 5,786,918 A | 7/1998 | Suzuki et al. |
| 5,789,768 A | 8/1998 | Lee et al. |
| 5,793,062 A | 8/1998 | Kish, Jr. et al. |
| 5,796,376 A | 8/1998 | Banks |
| 5,804,822 A | 9/1998 | Brass et al. |
| 5,805,081 A | 9/1998 | Fikacek |
| 5,805,209 A | 9/1998 | Yuge et al. |
| 5,806,965 A | 9/1998 | Deese |
| 5,808,592 A | 9/1998 | Mizutani et al. |
| 5,809,161 A | 9/1998 | Auty et al. |
| 5,809,681 A | 9/1998 | Miyamoto et al. |
| 5,810,833 A | 9/1998 | Brady et al. |
| 5,818,421 A * | 10/1998 | Ogino et al. ............... 345/157 |
| 5,826,965 A | 10/1998 | Lyons |
| 5,828,055 A | 10/1998 | Jebens |
| 5,831,155 A | 11/1998 | Hewitt |
| 5,838,024 A | 11/1998 | Masuda et al. |
| 5,838,247 A | 11/1998 | Bladowski |
| 5,838,259 A | 11/1998 | Tonkin |
| 5,848,837 A | 12/1998 | Gustafson |
| 5,860,135 A | 1/1999 | Sugita |
| 5,872,646 A | 2/1999 | Alderman et al. |
| 5,875,261 A | 2/1999 | Fitzpatrick et al. |
| 5,884,997 A | 3/1999 | Stanuch et al. |
| 5,898,381 A | 4/1999 | Gartner et al. |
| 5,900,850 A | 5/1999 | Bailer et al. |
| 5,917,637 A | 6/1999 | Ishikawa et al. |
| 5,929,788 A | 7/1999 | Vukosic |
| 5,931,562 A | 8/1999 | Arato |
| 5,931,570 A | 8/1999 | Yamuro |
| 5,932,860 A | 8/1999 | Plesko |
| 5,934,694 A | 8/1999 | Schugt et al. |
| 5,939,996 A | 8/1999 | Kniveton et al. |
| 5,946,417 A | 8/1999 | Bonneau et al. |
| 5,948,038 A | 9/1999 | Daly et al. |
| 5,959,752 A | 9/1999 | Ota |
| 5,960,135 A | 9/1999 | Ozawa |
| 5,965,879 A | 10/1999 | Leviton |
| 5,966,073 A | 10/1999 | Walton |
| 5,975,714 A | 11/1999 | Vetorino et al. |
| 5,990,802 A | 11/1999 | Maskeny |
| 5,991,085 A * | 11/1999 | Rallison et al. ............... 359/630 |
| 6,009,650 A | 1/2000 | Lamparter |
| 6,014,237 A | 1/2000 | Abeles et al. |
| 6,018,899 A | 2/2000 | Hanitz |
| 6,028,694 A | 2/2000 | Schmidt |
| 6,035,053 A | 3/2000 | Yoshioka et al. |
| 6,035,055 A | 3/2000 | Wang et al. |
| 6,035,074 A | 3/2000 | Fujimoto et al. |
| 6,067,010 A | 5/2000 | Wang |
| 6,067,011 A | 5/2000 | Leslie |
| 6,067,018 A | 5/2000 | Skelton et al. |
| 6,072,893 A | 6/2000 | Luo et al. |
| 6,081,206 A | 6/2000 | Kielland |
| 6,081,304 A * | 6/2000 | Kuriyama et al. ............ 348/838 |
| 6,086,229 A | 7/2000 | Pastrick |
| 6,091,025 A | 7/2000 | Cotter et al. |
| 6,094,148 A | 7/2000 | Henry et al. |
| 6,095,661 A | 8/2000 | Lebens et al. |
| 6,095,663 A | 8/2000 | Pond et al. |
| 6,102,696 A | 8/2000 | Osterwalder et al. |
| 6,106,137 A | 8/2000 | Adams et al. |
| 6,111,671 A | 8/2000 | Bahuguna et al. |
| 6,118,388 A | 9/2000 | Morrison |
| 6,121,898 A | 9/2000 | Moetteli |
| 6,126,087 A | 10/2000 | Hedger et al. |
| 6,159,005 A | 12/2000 | Herold et al. |
| 6,166,496 A | 12/2000 | Lys et al. |
| 6,177,678 B1 | 1/2001 | Brass et al. |
| 6,183,100 B1 | 2/2001 | Suckow et al. |
| 6,188,738 B1 | 2/2001 | Sakamoto |
| 6,243,492 B1 | 6/2001 | Kamei |
| 6,249,340 B1 | 6/2001 | Jung et al. |
| 6,268,788 B1 | 7/2001 | Gray |
| 6,271,814 B1 | 8/2001 | Kaoh |
| 6,271,815 B1 | 8/2001 | Yang |
| 6,271,913 B1 | 8/2001 | Jung et al. |
| 6,292,575 B1 | 9/2001 | Bortolussi et al. |
| 6,293,904 B1 | 9/2001 | Blazey et al. |
| 6,318,886 B1 | 11/2001 | Stopa et al. |
| 6,352,358 B1 | 3/2002 | Lieberman et al. |
| 6,367,949 B1 | 4/2002 | Pederson |
| 6,369,849 B1 | 4/2002 | Rzyski |
| 6,377,558 B1 | 4/2002 | Dent |
| 6,380,865 B1 | 4/2002 | Pederson |
| 6,389,115 B1 | 5/2002 | Swistock |
| 6,389,155 B2 | 5/2002 | Funayama et al. |
| 6,396,954 B1 | 5/2002 | Kondo |
| 6,400,828 B2 | 6/2002 | Covell et al. |
| 6,411,022 B1 | 6/2002 | Machida |
| 6,424,269 B1 | 7/2002 | Pederson |
| 6,461,008 B1 | 10/2002 | Pederson |
| 6,462,669 B1 | 10/2002 | Pederson |
| 6,469,631 B1 | 10/2002 | Pederson |
| 6,472,996 B1 | 10/2002 | Pederson |
| 6,476,726 B1 | 11/2002 | Pederson |
| 6,504,487 B1 | 1/2003 | Pederson |
| 6,532,212 B1 | 3/2003 | Soloway |
| 6,547,410 B1 | 4/2003 | Pederson |
| 6,548,967 B1 | 4/2003 | Dowling et al. |
| 6,590,343 B2 | 7/2003 | Pederson |
| 6,590,502 B1 | 7/2003 | Pederson |
| 6,600,274 B1 | 7/2003 | Hughes |
| 6,600,899 B1 | 7/2003 | Radomsky |
| 6,614,359 B2 | 9/2003 | Pederson |
| 6,623,151 B2 | 9/2003 | Pederson |
| 6,683,590 B1 | 1/2004 | Pang et al. |
| 6,690,294 B1 | 2/2004 | Zierden |
| 6,693,551 B2 | 2/2004 | Pederson |
| 6,705,745 B1 | 3/2004 | Pederson |
| 6,707,389 B2 | 3/2004 | Pederson |
| 6,788,217 B2 | 9/2004 | Pederson |
| 6,814,459 B2 | 11/2004 | Pederson |
| 6,819,654 B2 | 11/2004 | Soloway |
| 6,819,677 B1 | 11/2004 | Nouzovsky |
| 6,822,578 B2 | 11/2004 | Pederson |
| 6,844,824 B2 | 1/2005 | Vukosic |
| 6,879,263 B2 | 4/2005 | Pederson et al. |
| 6,892,942 B1 | 5/2005 | Widl et al. |
| 7,006,768 B1 | 2/2006 | Franklin |
| 7,023,469 B1 | 4/2006 | Olson |
| 7,046,160 B2 | 5/2006 | Pederson et al. |
| 7,102,665 B1 | 9/2006 | Chandler et al. |
| 7,103,614 B1 | 9/2006 | Kucik |
| 7,183,895 B2 | 2/2007 | Bazakos et al. |
| 7,230,884 B2 | 6/2007 | Shemesh |
| 7,289,731 B2 | 10/2007 | Thinguldstad |
| 7,309,965 B2 | 12/2007 | Dowling |
| 7,324,757 B2 | 1/2008 | Wilson |
| 7,439,847 B2 | 10/2008 | Pederson |
| 7,439,874 B2 | 10/2008 | Sotiriou |
| 7,548,698 B2 | 6/2009 | Yamamoto |
| 7,557,521 B2 | 7/2009 | Lys |
| 7,583,901 B2 | 9/2009 | Nakagawa |
| 7,912,377 B2 | 3/2011 | Koga |
| 8,126,554 B2 | 2/2012 | Kane |
| 8,175,799 B1 | 5/2012 | Woehler |
| 8,188,878 B2 | 5/2012 | Pederson |
| 8,188,879 B2 | 5/2012 | Pederson |
| 8,207,821 B2 | 6/2012 | Roberge |

(56) References Cited

U.S. PATENT DOCUMENTS

| | | | |
|---|---|---|---|
| 8,538,692 B2 | 9/2013 | Wurman | |
| 8,571,411 B2 | 10/2013 | Pederson | |
| 2002/0109892 A1 | 8/2002 | Seto | |
| 2002/0168958 A1 | 11/2002 | Ford | |
| 2003/0025608 A1 | 2/2003 | Pederson | |
| 2003/0118216 A1 | 6/2003 | Goldberg | |
| 2003/0156037 A1 | 8/2003 | Pederson | |
| 2003/0169164 A1 | 9/2003 | Lau | |
| 2003/0185340 A1 | 10/2003 | Frantz | |
| 2003/0212996 A1 | 11/2003 | Wolzien | |
| 2003/0222587 A1 | 12/2003 | Dowling, Jr. | |
| 2004/0044709 A1 | 3/2004 | Cabrera et al. | |
| 2004/0151344 A1 | 8/2004 | Farmer | |
| 2004/0153229 A1 | 8/2004 | Gokturk | |
| 2004/0208599 A1 | 10/2004 | Swartz et al. | |
| 2005/0002673 A1 | 1/2005 | Okano | |
| 2005/0005794 A1 | 1/2005 | Inukai | |
| 2005/0057941 A1 | 3/2005 | Pederson et al. | |
| 2005/0111700 A1 | 5/2005 | OBoyle | |
| 2006/0056855 A1 | 3/2006 | Nakagawa | |
| 2006/0132382 A1* | 6/2006 | Jannard | 345/8 |
| 2006/0149813 A1 | 7/2006 | Janik | |
| 2006/0213731 A1 | 9/2006 | Lesesky | |
| 2006/0238368 A1 | 10/2006 | Pederson | |
| 2007/0104239 A1 | 5/2007 | Koga | |
| 2007/0110446 A1 | 5/2007 | Hong et al. | |
| 2007/0145915 A1 | 6/2007 | Roberge | |
| 2007/0147843 A1 | 6/2007 | Fujiwara | |
| 2007/0160373 A1 | 7/2007 | Biegelsen | |
| 2007/0165244 A1 | 7/2007 | Yukhin | |
| 2007/0269219 A1 | 11/2007 | Teller | |
| 2007/0294029 A1 | 12/2007 | DAndrea | |
| 2008/0044188 A1 | 2/2008 | Kagawa | |
| 2008/0154101 A1 | 6/2008 | Jain | |
| 2008/0227463 A1 | 9/2008 | Hizume | |
| 2009/0002265 A1* | 1/2009 | Kitaoka et al. | 345/4 |
| 2009/0129782 A1 | 5/2009 | Pederson | |
| 2009/0157545 A1 | 6/2009 | Mobley | |
| 2010/0209105 A1 | 8/2010 | Shin | |
| 2011/0006898 A1 | 1/2011 | Kruest | |
| 2012/0202520 A1 | 8/2012 | George | |
| 2012/0230696 A1 | 9/2012 | Pederson | |

FOREIGN PATENT DOCUMENTS

| | | |
|---|---|---|
| CA | 2164920 | 6/1996 |
| DE | 4304216 | 8/1994 |
| DE | 19502735 | 8/1996 |
| DE | 19548639 | 6/1997 |
| DE | 19721673 | 11/1997 |
| DE | 29712281 | 1/1998 |
| EP | 0326668 | 8/1989 |
| EP | 0468822 | 1/1992 |
| EP | 0531184 | 3/1993 |
| EP | 0531185 | 3/1993 |
| EP | 0596782 | 5/1994 |
| EP | 0633163 | 1/1995 |
| EP | 0688696 | 12/1995 |
| EP | 0709818 | 5/1996 |
| EP | 0793403 | 9/1997 |
| EP | 0887783 | 12/1998 |
| EP | 0890894 | 1/1999 |
| EP | 0896898 | 2/1999 |
| EP | 0967590 | 12/1999 |
| EP | 1043189 | 10/2000 |
| EP | 1564914 | 8/2005 |
| FR | 2658024 | 8/1991 |
| FR | 2680861 | 3/1993 |
| FR | 2707222 | 1/1995 |
| FR | 2800500 | 5/2001 |
| GB | 1241369 | 8/1971 |
| GB | 2069257 | 8/1981 |
| GB | 2139340 | 11/1984 |
| GB | 2175428 | 11/1986 |
| GB | 2240650 | 2/1990 |
| GB | 2111270 | 6/1993 |
| GB | 2272791 | 5/1994 |
| GB | 2292450 | 2/1996 |
| GB | 2311401 | 9/1997 |
| GB | 2323618 | 9/1998 |
| GB | 2330679 | 4/1999 |
| GB | 2359179 | 8/2001 |
| GB | 2359180 | 8/2001 |
| JP | 60143150 | 7/1985 |
| JP | 63153166 | 6/1988 |
| JP | 6333403 | 12/1994 |
| JP | 06333403 | 12/1994 |
| JP | 08002341 | 1/1996 |
| JP | 8002341 | 1/1996 |
| JP | 10098778 | 4/1998 |
| WO | 97/50070 | 12/1997 |
| WO | 99/35634 | 7/1999 |
| WO | 99/42985 | 8/1999 |
| WO | 99/49435 | 9/1999 |
| WO | 99/49446 | 9/1999 |
| WO | 00/74975 | 12/2000 |
| WO | 0101675 | 1/2001 |
| WO | 01/10674 | 2/2001 |
| WO | 01/10675 | 2/2001 |
| WO | 0110676 | 2/2001 |
| WO | 02/25842 | 3/2002 |
| WO | 0225842 | 3/2002 |
| WO | 02/073836 | 9/2002 |
| WO | 2007003037 | 11/2007 |

OTHER PUBLICATIONS

Djahani et al., "Analysis of Infrared Wireless Links Employing Multibeam Transmitters and Imaging Diversity Receivers," IEEE Transactions on Communications, vol. 48, No. 12, Dec. 2000, pp. 2077-2088.

Kahn et al., "Wireless Infrared Communications," Proceedings of the IEEE, vol. 85, No. 2, Feb. 1997, pp. 265-298.

Komine T. et al., "Integrated System of White LED Visible-Light Communicaiton and Power-Line Communication," 20020915; 20020915-20020918, vol. 4, Sep. 15, 2002, pp. 1762-1766.

Hawaiian Electric Company, Inc.: Powerlines—Energy Efficiency Takes-off at Honolulu International Airport, Spring 2008, pp. 1-13.

Pacific Northwest National Laboratory: Demonstration Assement of Light-Emitting Diode (LED) Parking Lot Lighting, Phase 1, Jun. 2010, pp. 1-37.

T. Komine and M. Nakagawa, Integrated System of White LED Visible-Light Communication and Power-Line Communication Integrated System of White LED Visible-Light Communication and Power-Line Communication, Toshihiko Komine, Student Member, IEEE and Masao Nakagawa, Member, IEEE Date 1, Feb. 2003 pp. 71-79.

Van Wicklen, Garrett L.: Using LED Lights Can Reduce Your Electricity Costs, Dec. 2005, Cooperative Extension Service, Applied Poultry Engineering News, vol. 3, No. 1, pp. 1-4.

Jeffrey B. Carruthers, "Wireless Infrared Communications," Wiley Encyclopedia of Telecommunications, 2002.

* cited by examiner

VISIBLE LIGHT TRANSCEIVER GLASSES

In some embodiments the Visible Light Communication Transceiver Glasses utilize pulsed light communication as disclosed in U.S. Provisional Patent Application No. 61/165,546, filed Apr. 1, 2009; U.S. patent application Ser. No. 12/126,529, filed May 23, 2008; U.S. Provisional Application Ser. No. 60/931,611, filed May 24, 2007; U.S. patent application Ser. No. 12/126,227, filed May 23, 2008; U.S. patent application Ser. No. 12/126,342, filed May 23, 2008; U.S. patent application Ser. No. 12/126,647, filed May 23, 2008; U.S. patent application Ser. No. 12/126,469, filed May 23, 2008; U.S. patent application Ser. No. 12/126,589, filed May 23, 2008; U.S. patent application Ser. No. 12/032,908, filed Feb. 18, 2008; U.S. patent application Ser. No. 11/433,979, filed May 15, 2006; U.S. Pat. No. 7,046,160, issued May 16, 2006; U.S. Pat. No. 6,879,263, issued Apr. 12, 2005; U.S. patent application Ser. No. 12/254,587, filed Oct. 20, 2008; U.S. Provisional Patent application No. 60/405,379, filed Aug. 23, 2002; and U.S. Provisional Patent Application Ser. No. 60/405,592, filed Aug. 23, 2002, the entire contents of which are all expressly incorporated herein by reference. Applicant also incorporates by reference herein patent application Ser. No. 10/646,853, filed Aug. 22, 2003 and Provisional Patent Application No. 60/248,894, filed Nov. 15, 2000, the entire contents of each being expressly incorporated herein by reference.

The present application also claims the benefit of the filing date of U.S. Provisional Patent Application No. 61/165,546, filed Apr. 1, 2009.

In some embodiments the Visible Light Communication Transceiver glasses 10 are related to display or virtual reality glasses, examples of which may be identified in U.S. Pat. Nos. 7,224,326 B2; 7,062,797 B2; 6,816,132 B2; 6,452,572 B1; 6,160,666; 6,097,543; 6,084,555; 5,737,060; 5,619,373; and 5,347,400 the entire contents of which are all incorporated by reference herein in their entireties.

BACKGROUND OF THE INVENTION

Present communication techniques using wireless communication, including radiofrequency transmissions, (RF) raise security concerns because transmissions using RF can be easily intercepted, in part because of the fact that RF signals are designed to radiate signals in all directions. Also, radiofrequency transmissions may be regulated by the Federal Communications Commission (FCC) which may control the frequencies that may be used for RF transmission. Further, RF by its very nature is susceptible to interference and produces noise.

In contrast to RF communications, light sources used for communication are extremely secure due to the fact that the transmissions of light are of practical limited distance. Also, because the visible spectrum is not regulated by the FCC, light sources can be used for communications purposes without the need of a license. Light sources are also not susceptible to interference, nor do they produce noise that can interfere with other devices.

Light emitting diodes (LEDs) may be used as light sources for data transmission, as described in U.S. Pat. Nos. 6,879,263 and 7,046,160. LEDs have a quick response to "ON" and "OFF" signals, as compared to the longer warm-up and response times associated with fluorescent lighting, for example. LEDs are efficient in the production of light, as measured in lumens per watt. Recent developments in LED technology, such as high brightness blue LEDs, have paved the way for white LEDs, which have made LEDs a practical alternative to conventional light sources. This combination of lighting and communication allows ubiquitous light sources such as street lights, home lighting, and office building lighting, for example, to be converted to, or supplemented with, LED technology to provide for communications while simultaneously producing light for illumination purposes.

In addition to use as general lighting, LEDs may be used in networking applications. In any network, a variety of client devices may communicate with one or more host devices. The host may provide connection to a Local Area Network (LAN), sometimes referred to as an Intranet, owing to the common use of such a network entirely within an office space, building, or business. The host may additionally or alternatively provide connection to a Wide Area Network (WAN), commonly describing a network coupling widely separated physical locations which are connected together through any suitable connection, including for exemplary purposes, but not solely limited thereto such means as fiber optic links, T1 lines, Radio Frequency (RF) links including cellular telecommunications links, satellite connections, DSL connections, or even Internet connections. Generally, where more public means such as the Internet are used, secured access will commonly separate the WAN from general Internet traffic. The host may further provide access to the Internet.

A variety of client devices may be enabled to connect to host devices. Such client devices may commonly include computing devices of all sorts, ranging from hand-held devices such as Personal Digital Assistants (PDAs) to massive mainframe computers, and including Personal Computers (PCs). However, over time many more devices have been enabled for connection to network hosts, including for exemplary purposes printers, network storage devices, cameras, other security and safety devices, appliances, HVAC systems, manufacturing machinery, and so forth.

In the past, digital images and information have been displayed on LCD, Plasma or LED computer screens or Cathode Ray Tubes (CRT's) in various sizes and colors. In addition, information has been transmitted to larger audiences through the projection of information and images onto larger screens. These types of communications have also utilized audio capabilities by attaching speakers to the viewing devices, in order to enhance the presentation of information similar to watching Television screens of today.

In the past the automotive industry has attempted the use of Heads-up display technology to improve reaction time for the driver and reduce distraction, by projecting digital information onto the front windshield of the automobile. Information containing speed and turning indicator direction was typical for the types of information communicated in a Heads-up display. Upon initial deployment of the automotive Heads-up display technology, the information projected upon the windshield could not be altered, and therefore was perceived as limited in scope.

In the past the military developed what is termed as a "heads-up display" or (HUD) for pilots of Military planes and helicopters. The HUD reduced pilot distraction, thus improving the safety of flying or operating aircraft. The HUD projected vital flight information and images proximate to the windshield of the aircraft and was visible to the pilot's and co-pilot during flight. Information such as speed, altitude and fuel levels were among the information displayed in a HUD. The information projected onto a pilot's heads-up display screen originated from the output of equipment located internal to the aircraft via communication cables. Nearly all Heads-up Display devices were encumbered with electrical and communication cables that connected physically to remote devices offering broadcast information or images in close proximity to the person using the equipment.

Limited consumer grade equipment has also become available in the occluded version of vision glasses which is primarily utilized in gaming or Television. This equipment may be worn in similar fashion to glasses, but without the benefits of transparency.

True interactive, transparent, Mobile Heads-up Display, Wearable Glasses, or Virtual Retina Display Glasses are not yet available and the present devices fail to offer transparent viewing with clear information enhancements.

Some mobile wearable head gear apparatus designed to provide interaction with the user have been linked to a host server by Radio Frequency mediums, usually supplied by a wireless carrier or within a mesh network of unlicensed RF medium networks. These RF medium networks may be connected to much more powerful host data infrastructures, but given the current nature of RF Technology of today, the networks are not well suited for multiple clients using multiple high bandwidth consuming devices in close proximity of each other. Channel selection for individual use is typically unlicensed and unstructured there-by limiting use or capability.

In addition to being potentially unlicensed and unstructured, RF technology is not able to support the necessary bandwidth requirements in a safe manner to human tissue: to drive content rich information for the viewer.

Heads-up Display, Wearable Glasses, or Virtual Retina Display glasses obscure the normal vision of the person wearing the device. Many challenges are created as the user attempts to stabilize the movement which may create a safety concern during use of known Heads-up Display, Wearable Glasses, or Virtual Retina Display glasses.

Law Enforcement personnel have utilized portable computers mounted in a patrol car to one side of the officer. While the officer was checking information regarding a suspicious vehicle, he or she would be required to take there eyes off the vehicle in question and or the person(s) occupying or adjacent the vehicle, in order to observe the data displayed on the portable computer monitor or screen. This action reduces the effectiveness of the officer's reaction time to erratic movement or behavior and creates a potential hazard for the officer's safety.

No known forms of transparent Heads-up Display, Wearable Glasses, or Virtual Retina Display glasses are available to hospitals. As a patient is being attended to during a medical procedure, the doctor or nurse is required to review a patients medical information at a portable computer stand located somewhere in close proximity of the doctors or nurses. Time sensitive information, such as x-rays or biological test results may direct the medical doctor or nurse away from the patient potentially reducing the effectiveness of the medical treatment.

The known Heads-up Display, Wearable Glasses, or Virtual Retina Display Glasses, communicate in a single direction, which is considered as a download to the user. This can be accomplished by augmented data overlaid onto a reflective material.

RF Linked Devices are not currently able to support the necessary bandwidth requirements in a safe manner; to drive content rich information for the viewer.

BRIEF DESCRIPTION OF THE INVENTION

Figure 1:
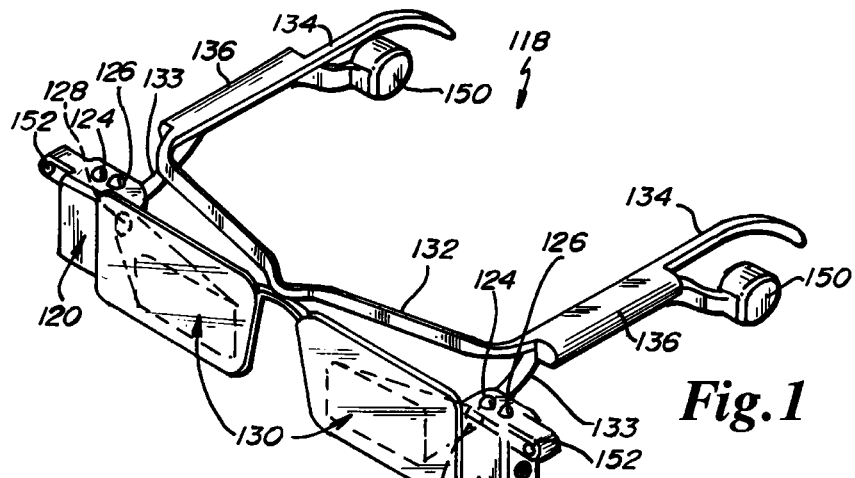
FIG. 1 is an isometric view of one embodiment of the visible light communication transceiver glasses.
Figure 2:
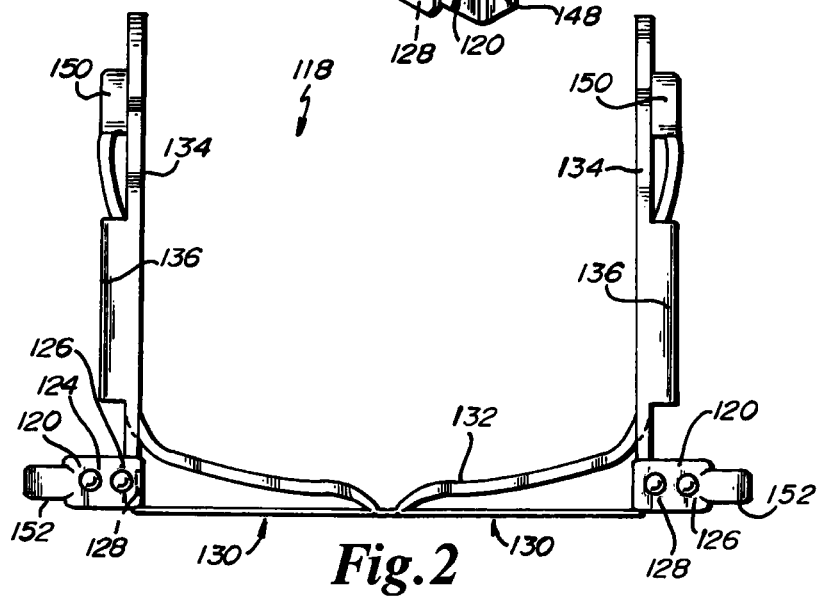
FIG. 2 is a top view of one embodiment of the visible light communication transceiver Glasses.
Figure 3:
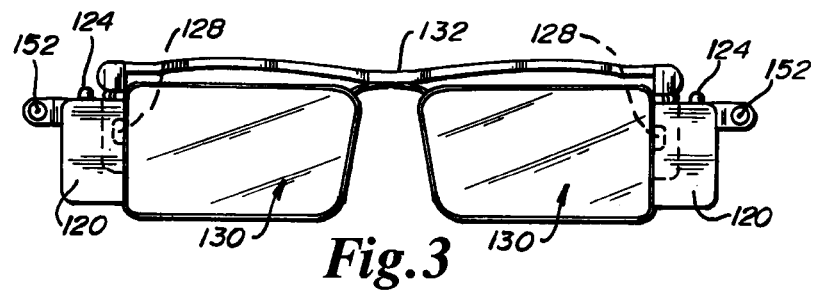
FIG. 3 is a front view of one embodiment of the visible light communication transceiver Glasses.
Figure 4:
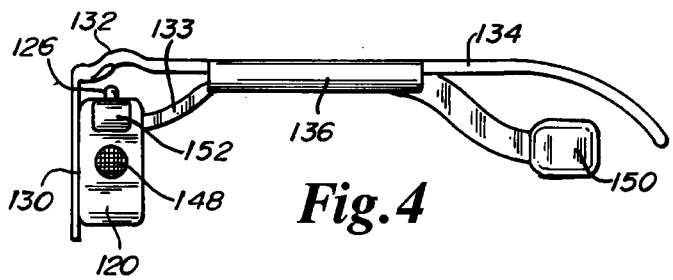
FIG. 4 is a side view of one embodiment of the visible light communication transceiver Glasses.
Figure 5:
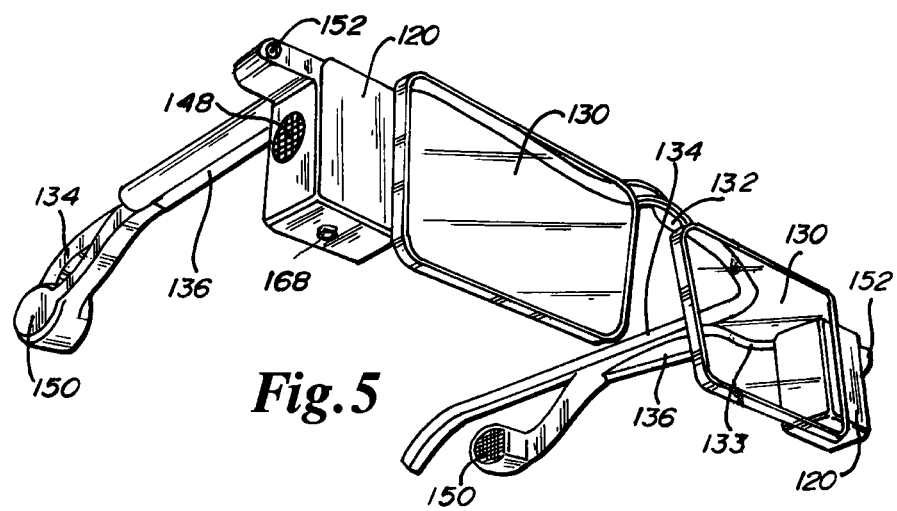
FIG. 5 is an alternative environmental perspective view of one embodiment of the visible light communication transceiver Glasses.
Figure 6:
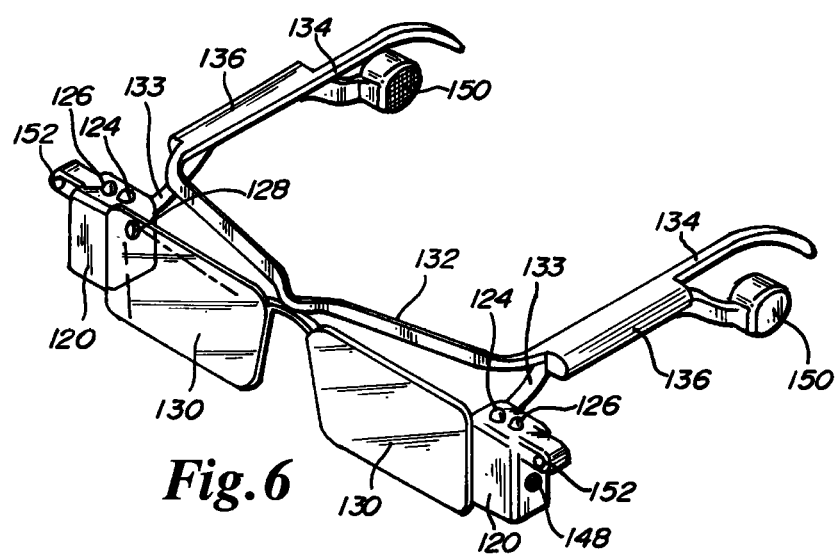
FIG. 6 is an alternative environmental perspective view of one embodiment of the visible light communication transceiver Glasses.
Figure 7:
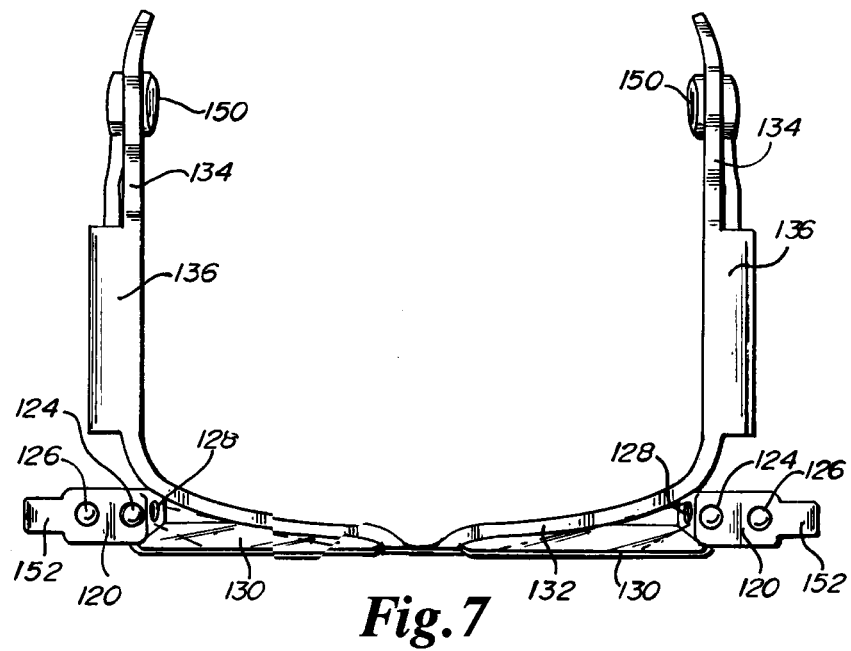
FIG. 7 is an alternative top detail view of one embodiment of the visible light communication transceiver Glasses.
Figure 8:
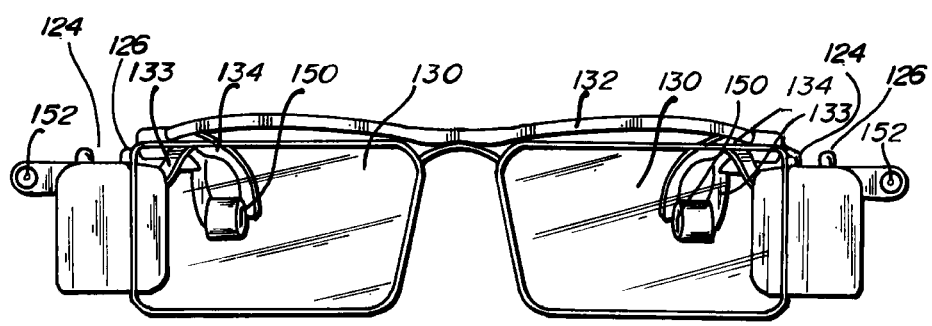
FIG. 8 is an alternative front detail view of one embodiment of the visible light communication transceiver Glasses.

RF Linked Devices do not offer all of the necessary levels of security compared to Visible Light Embedded Communications (VLEC) link of information traversing between the device and the host plexus.

In addition to being unlicensed and unstructured, RF technology is not able to support the necessary bandwidth requirements in a safe manner: to drive content rich information for the viewer. Still, regarding RF Linked Devices: the security levels of the content of information compared to a Visible Light Embedded Communications link of information, traversing between the device and the host plexus are at great risk. Heads-up Display, Wearable Glasses, or Virtual Retina Display glasses obscure the normal vision of the person wearing the device. This limits the movement and creates a safety concern.

In some embodiments it is desirable to provide a set of Visible Light Communication Transceiver Glasses (VLCTG's) in which a user may view real-world surroundings or over animated simulation, thus reducing potential motion sickness or vertigo.

In some embodiments, on the host VLEC network or plexus, having back-end presence awareness, servers may be fully integrated into a complete IT plexus, without the constraints and bottlenecking limitations of RF enable infrastructures, and the tethering of a wire line infrastructure to perform multiple forms of communication for the Client user to share and interact with other client VLCTG's in a plexus configuration.

In some embodiments as in Mobile Educational Classrooms, Professors may provide virtual classrooms while enhancing the experience for the student, by providing the student with a closer interaction ability in part due to the flow of information through the use of VLCTG's.

In at least one embodiment, the integration of VLCTG's with a Visible Light Embedded Communications Transceiver Host consisting of LED's transmitting, and a Photo Diode receiving, embedded light communication packets, permit communication and interaction into a Local area network or Wide area network, forming an Intranet or extranet, and coupled with a presence awareness server, and some predetermined legacy equipment, where upon a user may issue verbal commands or brainwave or other activities that act as commands to an intelligent presence awareness server. The Intelligent presence awareness server may include a vast database of information pertinent or personal to the specific user. A command string of information may be received by the "Visible Light Communication Display Glasses Client" and through a digitally computated process, the output of the chip couples the information immediately to the Visible Light Communication Display Glasses, which is then passed on electrically to the projector or Visible Light Communication Transceiver client interface located at some predetermined point on the Visible Light Communication Display Glasses.

In at least one embodiment the communication of information by Visible Light Embedded Communications, will traverse the Visible Light Communication link to a Visible Light Communication Transceiver Host. This host will continue to pass on the Visible Light Embedded Communication packets through a predetermined high capacity high bandwidth plexus or network. With regards to plexus or network connectivity, A Serial, USB, 1+N-base RJ-45 or Fiber optic connection may be in communication with a host Visible Light Embedded Communications fixture system, which is in communication with a host network processor. The host Visible Light Embedded Communications fixture replaces conventional stationary lighting fixtures to provide optical communication between the host and the client or user device through the Serial, USB, 1+N base RJ-45 or Fiber optic connection. The host Visible Light Embedded Communications fixture is preferably constructed an arranged to communicate data through pulsed light transmissions.

In some embodiments, the Visible Light Communication Transceiver Glasses provide internet access and communication capability between an individual and residential and commercial locations.

In some embodiments, the VLCTG's may be electrically coupled to a processor/controller which is used to process the light received from a Visible Light Embeded Communication source, to provide for display of various types of images and/or messages. The processor/controller may be, or include features of, a field programmable gate array and/or a direct logic circuit.

Individual light sources as a portion of the Visible Light Communication Transceiver Glasses system may be in electrical communication with other Visible Light Communication Transceiver Glasses through the use of suitable pulsed light communications network.

In some embodiments, the LED light sources on a set of Visible Light Communication Transceiver Glasses may be electrically coupled in either a parallel or series manner to a processor/controller. The processor/controller may also be in electrical communication with the power supply and the LEDs, to regulate or modulate the light intensity or signal for the LED light sources. In some embodiments, the processor/controller may be, or include features of, a field programmable gate array or direct logic circuit.

The Visible Light Communication Transceiver Glasses may also include photodetector receiver diodes coupled to the processor/controller, where the photodetector receiver diodes are constructed and arranged for receipt of pulsed LED light signals for conversion to digital information, and for transfer of the digital information to the processor/controller for analysis and interpretation. The processor/controller may then issue a transmission to a projector for display of an image on the lense(s), or may issue other communication signals to an individual, in order to communicate the content of received information transmitted via a pulsed LED light carrier.

The art referred to and/or described herein is not intended to constitute an admission that any patent, publication or other information referred to is "prior art" with respect to this invention. In addition, this section should not be construed to mean that a search has been made or that no other pertinent information as defined in 37 C.F.R. §1.56(a) exists.

All U.S. patents and applications and all other published documents mentioned anywhere in this application are incorporated herein by reference in their entireties.

Without limiting the scope of the invention, a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. §1.72.

DETAIL DESCRIPTION

For the purposes of this disclosure, like reference numerals in the figures shall refer to like features unless otherwise indicated.

In one embodiment as depicted in FIGS. 1 through 8 the Visible Light Communication Transceiver Glasses are referred to generally by reference numeral 118. In this description the Visible Light Communication Transceiver Glasses 118 may also be referred to as VLCTG or VLCTG's 118.

The VLCTG's 118 may in some embodiments be formed of two lenses 130. In other embodiments the VLCTG's 118 may be formed of a single lens 130.

In some embodiments the lenses 130 are engaged to and supported by a frame 132 which may include side supports 134 which may engage in individual's ears.

In some embodiments, on each side support 134, a battery 136 may be provided. The battery 136 may in some embodiments be rechargeable, and in other embodiments be replaceable. The battery 136 may also be integral with, or releasabley attached to, side supports 134.

In some embodiments, ear speakers 150 may be engaged to frame 132 on each side support 134. Ear speakers 150 are also in electric communication with the respective battery 136 and controller/processor 120. Controller/processor 120 processes received pulsed/encrypted visible light signals into digital signals to be generated by projector 128 onto lenses 130. Controller/processor 120 also processes received pulsed/encrypted visible light signals into digital signals to be generated as audible communications from speakers 150. Ear speakers 150 may be constructed and arranged for positioning proximate to, or for insertion within, an individual's ear. Ear speakers 150 may also, in certain embodiments, include electrical connectors to facilitate replacement with other types of speakers 150, which may have different audible specifications and/or dimensions.

In some embodiments, frame 132 may include lower frame elements 133 which may support controller/processor 120 on frame 132. Controller/processor 120 is positioned to the outside of, and proximate to, each lens 130 of VLCTG's 118. Each controller/processor 120 is in communication with projector 128. Each projector 128 includes a light source which generates a signal as communicated by controller/processor 120, for display of an image, text, symbol, or other communication or information on inside of lenses 130.

In some embodiments, lenses 130 are transparent permitting display images generated by controller/processor 120 to appear on lenses 130 as see-through images in a manner similar to a heads up display or HUD.

In some embodiments, lenses 130 may include desired optical coatings in order to facilitate display of images thereupon.

In some embodiments, each controller/processor 120 includes a microphone 148. Microphone 148 detects audible signals generated by an individual for processing within controller/processor 120. Controller/processor 120 may include voice recognition programming software in order to receive and execute voice commands as generated by an individual during use of the VLCTG's 118. In some embodiments, an individual may issue a voice command as detected by microphone 148, to direct controller/processor 120 to change software applications, to search for information, to generate communications for transmission to a server optical transceiver (XCVR) as a pulsed/encrypted light signal, or to change channels or power down the VLCTG's 118. It should be noted that the above identified voice commands are provided as examples of the types of commands which controller/processor 120 may recognize for execution, and that the above identified examples are not exhaustive and/or are not limiting with respect to the types of commands and/or actions which may be taken by controller/processor 120 during use of VLCTG's 118.

In some embodiments, at least one LED transmitter 124 and at least one photodetector receiver diode 126 are disposed proximate to, and/or on top of, controller/processor 120. Each of the LED transmitters 124 are in electrical communication with the controller/processor 120 in order to generate pulsed/encrypted light signals for transmission of information to an XCVR 116 as integral to a network plexus. The controller/processor 120 creates and regulates the duty cycle and pulsation of the LED transmitters 124, in order to transmit information which may be in the form of data packets for detection by photodetector receiver diodes 126 integral to XCRV's 116. Communication of information and/or signals may thereby be generated by controller/processor 120 integral to VLCTG's 118 for transfer through the network plexus for receipt at a desired location.

In some embodiments, each of the photodetector receiver diodes 126 are in electrical communication with the controller/processor 120 in order to detect and receive pulsed/encrypted light signals as generated by an XCVR 116 from a network plexus. The photodetector receiver diodes 126 receive the transmissions of information via pulsed light signals from the network plexus, and electrically transfer the signals or information to the controller/processor 120 of the VLCTG's 118, for processing. The controller/processor 120 then generates electrical signals to the projector 128 for display of images and/or information on the interior or exterior of lenses 130.

In some embodiments, a camera 152 is disposed on, engaged to, or in contact with, each controller/processor 120. Camera 152 is in electrical communication with controller/processor 120 to record images and/or video as digital signals. Images and/or video as recorded by camera 152 may be stored in memory integral to controller/processor 120, and/or may be processed for transmission as pulsed light communications by LED transmitters 124 to XCVR 116 for communication to a desired location within the network plexus.

In some embodiments, camera 152 continuously records images, and in other embodiments, recording of images by camera 152 may be initiated by voice activation commands. In some embodiments, camera 152 may be similar in specifications and operation to cameras provided and available on cellular telephones.

In some embodiments, VLCTG's 118 may include an on/off button and/or a switch 168 which may be disposed on the bottom of one of the controller/processor 120.

In some embodiments, controller/processor 120 may include a port which is constructed and arranged for receipt of an electrical wire which is used to interface with a handheld device. The handheld device may be used to implement commands into controller/processor 120 to provide a user with the ability to switch applications, channels, and/or functions to be performed by the VLCTG's 118. In some embodiments, the handheld device may include a keypad and may be in the form of a personal digital assistant or PDA type of device.

In some embodiments, the elements of the LED transmitters 124 and/or the photodetector receiver diodes 126 may be disposed at other locations about the controller/processor 120. In some embodiments, the handheld device or PDA may include LED transmitters 124 and/or photodetector receiver diodes 126 where upon the handheld device and the VLCTG's 118 may communicate through the transmission and receipt of pulsed/encrypted light signals. Commands as related to applications, channels, and/or functions may thereby be transmitted by handheld device to controller/processor 120 for operation of VLCTG's 118.

In at least one embodiment, the projector 128 will utilize liquid crystal displays (LCD's) or organic light emitting diodes. A lens may also be used to magnify the displays to enlarge the image on the lenses 130 of the VLCTG's 118. In some embodiments, the projector 128 may display two images simultaneously, one for each eye of the user of the VLCTG's 118. The correct alignment of the images on the lenses 130 of the VLCTG's 118 assist a user's brain to form a composite image from the two images, providing a sense of depth in the formation of a 3D image. This is known as steoeropsis.

In some embodiments, the VLCTG's 118 are binocular or biocular. In some embodiments binocular display on the VLCTG's 118 will create two slightly different images one to each eye, where biocular displays project one image that is visualized simultaneously by both eyes. At least one embodiment, a combination of binocular and biocular images may be used in association with the VLCTG's 118. In some embodiments, the VLCTG's 118 may also display images so that a user feels immersed into the display. In at least one embodiment, the VLCTG's 118 are non-immersion enabling a user to at least partially see adjacent surroundings.

In some embodiments, the VLCTG's 118 relieve eye stress and/or cyber stress during use. In other embodiments, a user of the VLCTG's 118 may adjust the interpupillary distance between the lenses 130.

In some embodiments the camera 152 may capture 752× 480 images at 60 FPS to deliver a single 1504×480 side-by-side image for viewing in 3D stereoscopic video. In some embodiments the camera 152 provides for increased resolution or decreased resolution of an image compared to the image described above.

In some embodiments the VLCTG's 118 may permit diopter adjustment of +3.5 D to −3.5 D. for each eye which may be separately and continuously adjustable. In some embodiments, the camera 152 may record, and the projector 128 may project, images having areas of resolution greater or less than 640×480 pixel's per eye. In some embodiments the VLCTG's 118 provide a field of view of 32° which may be equivalent to a screen size of 45-inch and 2 m (6.5 feet) distance.

Figure 9:
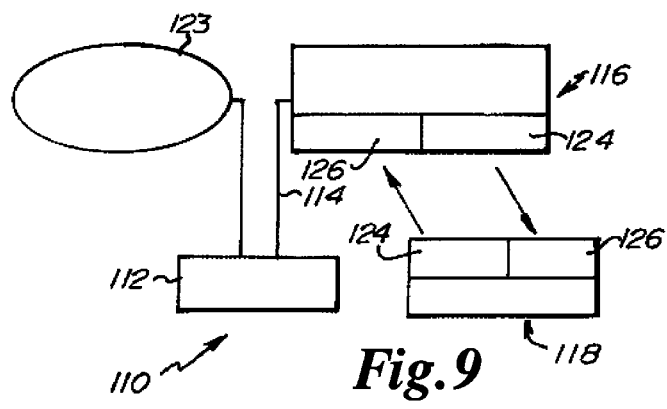
FIG. 9 is a block diagram of one embodiment of the Visible Light Communication Glasses System.

FIG. 9 depicts a block diagram for an embodiment 110 of an LED light and communication system including Visible Light Communication Transceiver Glasses 118. FIG. 9 shows a server PC 112 connected via a USB cable 114 to a server optical transceiver (XCVR) 116, and a set of Visible Light Communication Transceiver Glasses 118 having an optical transceiver. The server PC 112 may be in communication with a network 123 via a CAT-5 cable, for example. An exemplary optical XCVR (or, simply, "XCVR") circuit includes one or more LEDs 124 for transmission of light and one or more photodetectors 126 for receiving transmitted light. The term "photodetector" includes "photodiodes" and all other devices capable of converting light into current or voltage. The terms photodetector and photodiode are used interchangeably herein. The use of the term photodiode is not intended to restrict embodiments of the invention from using alternative photodetectors that are not specifically mentioned herein.

In at least one embodiment, the XCVR circuit may include an RS232 to USB conversion module. The transmit pin on the USB conversion module may drive the driver electronics for the LEDs. In some embodiments, the XCVR circuit includes high intensity LEDs. In some embodiments it may be desirable to use high intensity LEDs to enhance lighting, to improve data transmission, or both. In at least one embodiment, a 12 volt DC 3 amp power supply is sufficient for powering one or more high intensity LEDs.

In some embodiments, the XCVR circuit further includes an amplifier for amplifying the optical signal received by the photodiodes. The output of the amplifier may be fed into level shifting circuitry to raise the signal to TTL levels, for example. The signal may be fed into the receive pin of the RS232 to USB module.

In some embodiments, a 9V battery can be used to power the amplifier circuitry. Significant noise is generated by switching high brightness LEDs on and off at 200 mA and 500 kbps, for example. Powering the amplifier with a battery may reduce these noise problems by reducing or removing transients.

It should be noted that in some embodiments, the LED can both emit and receive light. In such an embodiment, the LED may act both as a transmitter or receiver. More information on such bi-directional LEDs can be found in U.S. Pat. No. 7,072,587, the entire contents of which are expressly incorporated herein by reference.

The use of pulsed light as the communications channel between a set of Visible Light Communication Transceiver Glasses 118 and host, offers an advantage in security, reliability, system testing and configuration, bandwidth, infrastructure, and in other ways. Security is greatly increased because pulsed light signals do not go through walls, in contrast to radio communications, and steps can be taken to obstruct visible transmissions with a much greater certainty than with high frequency radio waves. Furthermore, the visible pulsed light may additionally be limited or directed by known optical components such as lenses and reflectors to selectively form beams, as opposed to omni-directional transmissions.

Set-up, testing, troubleshooting and the like are also vastly simplified. When the light communication system is working, the user may actually visualize the illumination and the communication as projected by the projector 128 on one or more lense(s) 130. If an object interferes with light transmission, the user will again immediately recognize the same. Thus, the ease and convenience of this Visible Light Communication Transceiver Glasses System adds up to greater mobility and less cost. In addition, relatively high energy outputs may be provided where desired, using the preferred visible light communications channel, since the human eye is adapted and well-protected against damage from light. In contrast, many invisible transmission techniques such as Ultraviolet (UV) or Infra-Red (IR) systems have much potential for harm.

In at least one embodiment a host lamp fixture system or a stationary (mounted in a particular place) lighting fixture may be used in order to communicate data. Inside of LED lights there may be one or many diodes; these may pulsate on slightly different frequencies from a single light to communicate. Each may be looking for changes by way of Multiple Channel Access or other suitable technique.

When a client using a set of Visible Light Communication Transceiver Glasses 118 inputs or initiates a request for channels, the host 112 may respond with the location of the channels. LED lights 124 in a ceiling, for example, will communicate with any capable transceiver. One suitable method may use BPL (Broadband over Power Lines) for network connection, taking data and embedding the data into a carrier frequency or group like radio, but instead using power lines or wave guides for transmission throughout an existing set of power lines within a building. Thus, a building may be wired only for lights, saving a huge infrastructure of other wires and fixtures, saving a great deal of money.

In at least one embodiment, the optical XCVRs 116, or circuitry attached thereto, include modulation circuitry for modulating a carrier signal with the optical signal. Modulation can be used to eliminate bias conditions caused by sunlight or other interfering light sources. Digital modulation may be accomplished by using phase-shift keying, amplitude-shift keying, frequency-shift keying, quadrature modulation, digital coding, code spreading modulation, orthogonal frequency division multiplexing, digital coding, code spreading modulation, orthogonal frequency division multiplexing, or any other digital modulation technique known by those of ordinary skill. Similarly, such XCVRs 116 can include demodulation circuitry that extracts the data from any received signals. Modulation and demodulation techniques are described in U.S. Pat. Nos. 4,732,310, 5,245,681, and 6,137,613, the entire contents of each being expressly incorporated herein by reference.

It may be desirable in some embodiments to further include filters or filter circuitry to prevent unwanted light from being amplified. For example, the optical baseband signal may be modulated at 100 kHz and then transmitted. The XCVR 116 that receives the 100 kHz modulated signal may include a filter stage centered at 100 kHz. The filtered 100 kHz signal may then be input into the amplifier circuitry, thereby preventing amplification of unwanted signals. In some embodiments, it may be desirable to amplify the transmitted signal first, and then filter out the baseband signal.

In one embodiment, an Internet Provider, connected to the Internet, provides Internet Access via fiber optic cable, or other transmission medium, to a power substation (4kV-30kV, for example). In order to inject the signals onto the power lines, a power line bridge may be provided that may modulate, alter, or otherwise adapt the Internet signals (not shown) for transmission over the power lines. As mentioned above, this is a simplification. More information may be found in U.S. Pat. No. 7,349,325, the entire disclosure of which is expressly incorporated herein by reference. As used herein, the term "power line bridge" is used to denote any device that is capable of injecting Internet signals onto power lines, whether it is located at a substation or power line, home, business, etc., or any device that can extract an Internet signal from the power lines in a home, business, etc.

In at least one embodiment, data signals may exit the distribution substation on the distribution bus (not shown) which may then be injected onto the power lines (either overhead or, preferably, underground). In at least one embodiment, the power lines may be fed to street lights. Each street light may be adapted to use an optical XCVR 116, such as those described above. Although it is envisioned that current street lamp light sources would be replaced with optical XCVRs 116. In some embodiments, the optical XCVRs 116 may be used in conjunction with current street lamp light sources. Prior to broadcasting the data via a light signal from the LED street light, the data must be extracted via demodulation techniques from the power supplied to the street light (not shown).

Using street lamps and/or other light LED sources as an Internet connection point, takes advantage of the ubiquity of street lighting for transmission of communications to and from the Visible Light Communication Transceiver Glasses 118. Generally, electricity is supplied to street lamps or LED lighting fixtures via underground cables and through internal wiring. This design significantly reduces the amount of RF noise radiated during transmission of the signals. And, when finally broadcast, the signal is in the form of light, and is thus not a source of RF noise.

In at least one embodiment, the street lights and/or LED lighting form an optical link with customers which may be using a pair of Visible Light Communication Transceiver Glasses 118. The optical XCVRs 116 in the street lights or LED lighting transmit light to and receive light from the optical XCVRs that are used by an individual.

In at least one embodiment, a set of Visible Light Communication Transceiver Glasses 118 provides Internet access to a customer. The customer's VLCTG's 118 may be in operative communication with a power line bridge. The power line bridge may modulate the signal sent via the street light or other LED light source and injects the modulated signal onto electrical wiring, usually at 120-240 VAC for transmission from an LED light source 124 for reception by the photodetectors 126 integral to the Visible Light Communication Transceiver Glasses 118. In at least one embodiment, the modulated signal is injected onto the electrical wiring at the electrical mains feed at the circuit breaker panel. This embodiment may inject the signal to all electrical circuits at a designated location, providing access to the signal on each electrical circuit in the location. In some embodiments, rather than injecting onto the electrical wiring at the electrical mains feed at the circuit breaker panel, the modulated signal can be injected onto specific electrical circuits, if desired.

In at least one embodiment, after signals are injected onto the electrical wiring, a number of methods may be available for transmitting the data to the end user. In some embodiments, another power line bridge is used to demodulate the signal from the electrical power. For example, a power line bridge similar to a BellSouth® Powerline USB Adapter may be used. Of course, a power line bridge may also be Ethernet compatible. The power line bridge may plug into an electrical outlet, demodulate the signal from the electrical power, and transmit the signal to electronic equipment providing Internet access.

In at least one embodiment, the signal is in operative communication with the electronic equipment via cables, such as Ethernet cables.

In other embodiments, the power line bridge plugged into the electrical outlet includes an optical XCVR 116, and instead of cables, an optical link provides the transmission medium to the electronic equipment which may be a set of Visible Light Communication Transceiver Glasses 118. Of course, in such an embodiment, another optical photodetector receiver in communication with the Visible Light Communication Transceiver Glasses 118 which receives and transmits data.

In some embodiments, an optical XCVR 116 provides lighting for one or more rooms on the customer premises. In operative communication with the optical XCVR 116 may be a power line bridge that demodulates the signal from the electrical power that supplies power to AC/DC converter that supplies power to the LED array of the XCVR 116. The power line bridge sends the demodulated signal to the optical XCVR 116 for transmission.

It can be desirable, however, to modulate the light signal prior to transmission to reduce the effects of external lighting. The light sent via the optical XCVR 116 over the optical link may be received by another optical XCVR in communication with the Visible Light Communication Transceiver Glasses 118 and may be demodulated, as described above. Such an embodiment may be desirable because each room at a customer premise may be either designed for, or retrofitted with, optical XCVRs 16 in the ceiling, for example, for lighting. As such, the main light source in the room doubles as an optical link for the Visible Light Communication Transceiver Glasses 118. Because the optical XCVRs 116 are located in the ceiling, there are few items that can block the light signal to the VLCTG's 118.

Injecting the signal onto the electrical wiring and providing an optical link through LED lighting is advantageous over wireless DSL modems. Often times, metal shelving or other structures on the premises interfere with or even block RF signals, thereby requiring multiple access points. However, providing an optical link through LED lighting in each room, for example, inherently provides multiple access points.

In an alternative embodiment, Internet access is provided to a customer's electrical wiring by standard Broadband over power line techniques, without the use of LED lighting in street lights, for example, such as described in U.S. Pat. No. 7,349,325 incorporated by reference herein in its entirety. However, once the signal is on the customer's electrical wiring, it can be extracted and broadcast over an optical link using optical XCVRs, as described above.

Figure 10:
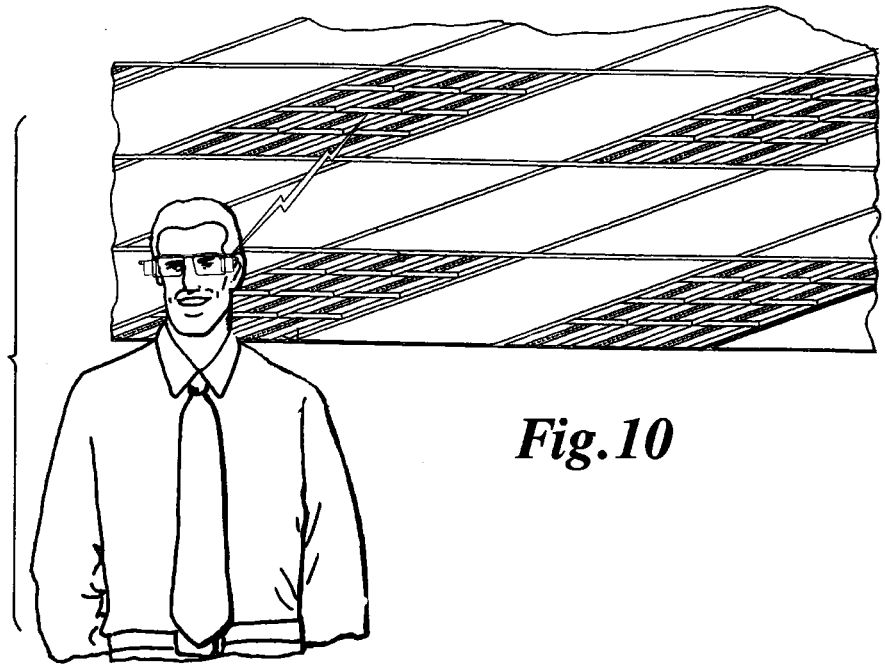
FIG. 10 is an environmental view of one embodiment of the Visible Light Communication Transceiver Glasses System.
Figure 11:
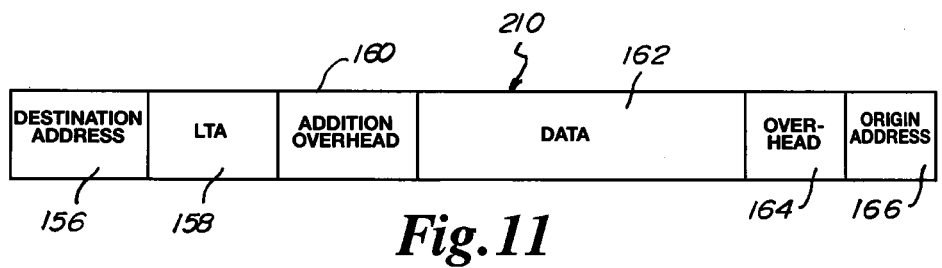
FIG. 11 is a block diagram of one embodiment of a data packet.

In another embodiment of the invention, Visible Light Communication Transceiver Glasses 118 (VLCTG) and/or user interface devices may include optical XCVRs 116, as shown in FIG. 10. The photodetector receiver, and LED transmitters of a set of VLCTG 118 communicates with the optical XCVRs 116 that are also acting as room lighting, hall lighting, or other lighting in a customer's facility. Of course, the optical XCVRs 116 can be placed in numerous other locations as lighting sources. Using the XCVRs 116 as light sources can reduce energy consumption and simplify communications by reducing the filtering or modulation complexities necessary to distinguish data signals from extraneous lighting sources. An individual may use a set of VLCTG 118 in order to broadcast and receive data over an optical link using the XCVR 116 to a ceiling mounted fixture.

Visible Light Communication Transceiver Glasses 118 may also include features commonly found in standard security identification badges, including but not limited to such attributes as anti-counterfeiting features for an assigned indicia such as employee identification number, or name. An embedded non-alterable electronic, visible, sonic or other identification codes may also be provided in Visible Light Communication Transceiver Glasses 118.

In at least one embodiment a projector 128 and photodetector receiver diodes 126 are provided and enable communication over an optical communications channel. A microphone 148, and ear speakers 150 may be provided to integrate an auditory communication channel between communication VLCTG 118 and the network plexus. A camera, or video camera 152 may be incorporated to capture video or still pictures. In at least one embodiment, images may be displayed by projector 128 on lenses 130 incorporated into VLCTG 118, permitting information to be displayed thereon, which for exemplary purposes could comprise either text, images or graphics as well as other types of communications.

Depending upon the intended application for which VLCTGs 118 are being designed, the VLCTG's 118 may include various video resolution and/or display specifications, and the camera 152 may include various resolution specifications. Information may also be communicated continuously to the VLCTG's 118 or upon request or by polling.

Visible Light Communication Transceiver Glasses 118 communicate with XCVR 116 through use of LED light sources 124. LED light sources 124 may include at least one, and preferably a plurality of LEDs, which may also be in communication with photodetector receiver diodes 126. The one or more photodetector receiver diodes 126 may be broad spectrum detectors or alternatively color-filtered or sensitive to only a single color. The types of detectors utilized will be determined by well-known considerations such as sensitivity, reliability, availability, cost and the like.

A variety of physical and electrical configurations are contemplated herein for LED light source 124. An LED light source 124 may replace a standard fluorescent tube light fixture. This can be accomplished by replacing the entire fixture such that ballasts and other devices specific to fluorescent lighting are replaced. In many cases, this will be the preferred approach. The fixture may then be wired for any suitable or desired voltage, and where a voltage or current different from standard line voltage is used, transformers or power converters or power supplies may be provided. When a building is either initially being constructed, or so thoroughly remodeled to provide adequate replacement of wires, the voltage may be generated in transformers that may be provided outside of the occupied space, such as on the roof, in a utility room, basement or attic. In addition to other benefits, placement in these locations will further reduce requirements for air conditioning.

As efficiencies of light generation by LEDs are now beginning to surpass fluorescent tubes, such entire replacement is more economical. However, total replacement of such fixtures is not the only means contemplated herein. Any lesser degree of replacement is also considered in alternative embodiments. For exemplary purposes, the physical reflectors commonly associated with fluorescent fixtures may be preserved, and the fixture simply rewired to bypass any ballasts or starter circuitry that might be present. In this case, line voltage, such as 120 VAC at 60 Hertz in the United States, may pass through the electrical connector pins. In at least one embodiment, a base of an LED light source 124 may be designed to insert directly into a standard fluorescent socket, such as, for exemplary purposes only, and not limited thereto, the standard T8 and T12 sockets used in the United States. In such case, either red, green, or blue LEDs may be arranged and wired to directly operate from line voltage, or appropriate electronics will need to be provided directly in LED base to provide necessary power conversion. In yet another conceived alternative embodiment, power conversion may be provided through switching-type or other power conversion circuitry to alleviate the need for any rewiring, though in these instances the power conversion circuitry will need to accommodate the particular type of ballast already in place.

Where other types of fixtures already exist, such as standard incandescent Edison screw bases, LED bulbs may similarly accommodate the fixture. For incandescent replacement, no rewiring or removal of ballasts is required, since line voltage is applied directly to incandescent fixtures. Consequently, appropriate conversion may in one conceived alternative embodiment simply involve the replacement of a bulb with no fixture or wiring alterations.

For LED light source 124 to replace an existing bulb, regardless of type, and benefit from the many features enabled in the preferred embodiment, communications circuitry must also be provided. This communications circuitry is necessary to properly illuminate each of the red, green and blue LEDs to desired color, to transport data through an optical communications channel.

In accord with at least one embodiment of the invention, LEDs are used to transmit through optical communication channel several kinds of data, including identity, location, audio and video information. The use of an optical communications link provides large available bandwidth, which in turn permits multiple feeds of personal communication between LED light sources 124 and VLCTG's 118 similar to or in excess of that of cell phones. The optical data is transferred at rates far in excess of those detectable by the human eye, and so a person is not able to detect any visible changes as the data is being transferred. Additionally, because optical illumination is constrained by opaque objects such as walls, the location of a set of VLCTG's and associated person can be discerned to a particular room, hallway or other similar space.

Some embodiments of the VLCTG's 118 include any or all or any combination of the following devices: a microphone 148, ear speaker 150, a rechargeable battery 154, and a video camera 152. In at least one embodiment, the microphone 148 is in communication with an analog-to-digital converter (ADC)(not shown) for converting the analog speech input to a digital signal. An amplifier circuit can be used to boost the microphone signal. The signal can be amplified prior to or after the ADC. In some embodiments, the speakers 150 are in communication with a digital-to-analog converter (DAC)(not shown) for converting the received digital signal to an analog output. An amplifier circuit can be used to boost the speaker signal. The signal can be amplified prior to or after the DAC. The processor 112 may convert the digital signals from the microphone/amplifier to data packets that can be used for transmission by the optical XCVR 116. Similarly, the processor 112 may convert the data packets received by the optical XCVR 116 to audio out signals directed to the VLCTG's 118 and speakers 150. The processor 112 can convert data packets received from or directed to the video camera 152. The term "processor" as used herein refers to a processor, controller, microprocessor, microcontroller, or any other device that can execute instructions, perform arithmetic and logic functions, access and write to memory, interface with peripheral devices, etc. The processor/controller also may be, or include features of, a field programmable gate array or direct logic circuit.

In such an embodiment, the user can use the VLCTG's 118 as a communication and/or recording device. Alternatively, the user may use the VLCTG's 118 to stream music, or video. Furthermore, the optical XCVR 116 and/or the VLCTG's 118 may also include non-volatile memory (FLASHRAM, EEPROM, and EPROM, for example) that can store firmware, as well as text information, audio signals, video signals, contact information for other users, etc., as is common with current cell phones.

The optical XCVR 116 and VLCTG's 118 may each include one or more photodetector receiver diodes 126 for receiving transmitted LED or other light signals, and one or more LEDs 124 for transmitting LED signals. In some embodiments, an optical signal amplifier is in communication with the photodetector receiver diodes 126 to increase the signal strength of the received light signals. In at least one embodiment, the LEDs 124 are in operative communication with an LED power driver, ensuring a constant current source for the LEDs.

In some embodiments, the VLCTG's 118 may include circuitry that performs modulation, demodulation, data compression, data decompression, up converting, down converting, coding, interleaving, pulse shaping, digital coding, code spreading modulation, orthogonal frequency division multiplexing, and other communication and signal processing techniques.

In at least one embodiment, the VLCTG's 118 are embedded with a unique code, similar in principle to the MAC address of a computer, for example. Thus, every VLCTG 118 has a unique identifier. The VLCTG 118 broadcasts the unique code at regular intervals, or irregular intervals if desired. Optical XCVRs 116 located within the user's building and near the user can then receive the unique code transmitted by the VLCTG 118.

There are numerous applications of such a design. For example, in some embodiments, an optical XCVR 116 may be engaged to a door lock. When a user with a set of VLCTG 118 approaches a locked door, the VLCTG's 118 broadcasts a unique code, and an optical XCVR 116 in communication with the door lock receives the code, and if acceptable, unlocks or opens the door. A table of acceptable codes may be stored in a memory device that is in communication with, and accessible by, the door's optical XCVR 116. Alternatively, the door's optical XCVR may transmit a code to a central station that compares the user's code against a table of approved codes and then sends a response either allowing or denying access.

In some embodiments a person walking down a hallway may receive a phone call on their VLCTG's 118 from a person on the other side of the world, as long as the other person was using the Internet to communicate, and knew the unique code of the VLCTG's 118. Such communication is possible because the Internet is based upon transmission of packetized data, a form ideally suited for use with an optical XCVR 116.

In at least one embodiment, the VLCTG's 118 may be used in conjunction with the LED lighting in hallways, rooms, etc. to reduce energy consumption. For example, all the lights in a hallway may have a standby setting such that they are relatively dim or even off. As a person with a set of VLCTG's 118 proceeds down a hallway, the lights in front of the person turn on in response to a transmitted signal (e.g. the unique code of the VLCTG 118). As the person moves beyond a light, the light returns to its standby setting of dim/off brightness through a signal communicated from a XCVR 116 at a sufficiently remote location to indicate that the individual has passed, and is no longer present at this particular location. The presence of an individual proximate to an XCVR 116 may be determined by either recognition of a signal, or through the failure to continue to recognize a signal, or by a proximity calculation as based on a controller receiving a signal from a remote location, which indicates recognition of a VLCTG 118. A proximity may then be calculated where initial or previous XCVR light sources are extinguished as an individual passes a particular location. In other embodiments, the lights can gradually become brighter, as a percentage of full brightness, as a person approaches, and then gradually dim, as a percentage of full brightness, as a person moves away based on proximity calculation as earlier described.

The XCVR's 116, in accordance with an embodiment of the invention, may have AC wiring with data carriers such as S-BPL, and static locations encoded into the system. Thus a person entering a hallway with a set of VLCTG's 118 could use only those lights needed for his travel. As the person progresses toward a destination, the lights behind the person may be no longer needed and so may be programmed to turn off. These lights could function variably from 10 to 100% brightness as needed, for example. In at least one embodiment when a person has traveled, lights may be extinguished, in effect providing a moving "bubble" of illumination surrounding person wearing a set of VLCTG's 118.

In at least one embodiment of the present invention, extent of human interaction required to control various functions such as light switches and thermostats, is reduced while simultaneously increasing the capabilities of such controls. Individual or selected groups of lights may be selectively configured for optimal physiological and psychological effects and benefits for one or more applications, and then may be readily reconfigured without changes to physical structures for diverse applications having different requirements for optimal physiological and/or psychological effects and benefits. Such embodiments are an improvement over conventional motion detectors, due to the "smart" nature of the optical XCVRs 116 as integrated for communication with VLCTG's 118. Rather than waiting for a time delay, as is the case with motion detectors, the optical XCVRs 116 (and in some embodiments the optical XCVRs 116 in conjunction with software) in the lighting fixture, recognize immediately that the person has moved beyond a particular light, allowing that particular light to be dimmed or turned off. Also, this smart technology may be used to turn lights on only for people with the correct code embedded in their VLCTG's 118. In such an embodiment, the user can walk into a restricted area, and if not authorized to be there, the lights would remain off, and if authorized the lights would turn on.

In some embodiments, the VLCTG 118 may be used to assist emergency personnel. For example, if a person with a VLCTG 118 had an incapacitating emergency condition while walking along a hallway in a building with optical XCVRs 116, as in the embodiments described above, the hallway lighting can be modified to direct emergency workers directly to the injured person. The lights can be made to flash, change color, or form directional arrows, or sequential directional indicators, or otherwise signify to the emergency personnel the quickest path to the person.

In at least one embodiment a building employing an encoded light network/plexus may incorporate multiple safety features. Instead of relying on several security guards at several stations to read badges and monitor each station, a proximity detector may first detect whether a VLCTG 118 is passing through the entrance. If so, the adjacent LED light source will query for an appropriate or legitimate communications code or signal. Even if detected, if a VLCTG 118 has been duplicated, preferred logging and verification through software will instantly identify that the first person is already in the building. Consequently, the presently entering person and the person already in the building can both be located, and the intruder identified.

In at least one embodiment, if audio and/or video is additionally enabled by a user, video of the VLCTG's 118 can be used to capture the last-known conditions of a user or an area. This can be important during medical treatment or diagnosis or in the event a disaster strikes that results in significant destruction of property or life.

In at least one embodiment, the VLCTG's 118 may be in communication with an intelligent audio/visual observation and identification database system which may be coupled to sensors as disposed about a building. The combined system may then build a database with respect to temperature sensors within specific locations, pressure sensors, motion detectors, communications between and locations of VLCTG 118, phone number identifiers, sound transducers, and/or smoke or fire detectors. Recorded data as received from various sensors may be used to build a database for normal parameters and environmental conditions for specific zones of a structure for individual periods of time and dates. A computer may continuously receive readings/data from remote sensors and/or VLCTG's 118 for comparison to the pre-stored or learned data, to identify discrepancies therebetween. In addition, filtering, flagging and threshold procedures may be implemented to indicate a threshold discrepancy to signal initiation of an investigation. The reassignment of priorities and the storage and recognition of the assigned priorities occurs at the computer to automatically recalibrate the assignment of points or flags for further comparison to a profile prior to the triggering of a signal representative of a threshold discrepancy.

In at least one embodiment of the present invention, the VLCTG's 118 may incorporate guidance and communications systems. For exemplary purposes, consider the situation where a visitor wishes to meet with a regular building occupant. The visitor may be guided through the use any suitable color or intensity indicator pattern displayed on the VLCTG's 118 such as but not limited to flashing patterns, color changes or the like on an observed map, or other similar direction indicator in a heads-up display to the location or person they seek. Further, once within the same building space, the person being sought out may further be made conspicuous by similar changes in color intensity pattern or indicator within the sought-person's VLCTG 118. Once again, such system control using the LEDs of the present invention is simply a matter of software control.

In those embodiments where audio signaling or communications are enabled for the VLCTG's 118, and owing to the exact room position detection afforded by the present invention, location specific access intelligence may also be incorporated. As but one example, if a doctor is in a surgical room, a pager feature of the VLCTG's 118 may remain silent. Once the doctor exits surgery, then the pager may be reactivated. This control may be automatic, simply incorporated into the programming of the system. As another example, students may use the preferred VLCTG 118 for communications similar to cellular telephones, including text messaging, voice communications, web access, and so forth. This communication may occur through the use of voice recognition over microphone 148 or as a result of an interface with a supplemental electronic device such as a PDA by keys. However, upon entering a classroom, communications might in one embodiment then be disabled, ensuring the students are not distracted with unauthorized activities. In addition to the foregoing, audio and video communications are possible in accord with light communications in locations and environments where cellular or radio communications may be impossible, forbidden, or unreliable, extending existing communications systems.

Another embodiment of the present invention incorporates Global Positioning System (GPS) information into the data packet to be sent via network to a pair of VLCTG's. The Global Positioning System is described in U.S. Pat. No. 4,785,463, the entire contents of which are expressly incorporated herein by reference. GPS positioning uses one or more coordinate systems, such as World Geodetic System 1984 (WGS84), to provide a reference frame, allowing every point on earth to be coded with a unique GPS location.

GPS systems and cell phone triangulation techniques are typically only accurate to one or several hundred feet. Horizontally, this prior art precision is adequate for many applications. However, vertically several hundred feet could encompass twenty floors in an office or apartment building. In at least one embodiment the VLCTG's 118 are in communication with the plexus and are capable of GPS precision to a room or light fixture, improving GPS accuracy. The use of the VLCTG's 118 in association with the network plexus can locate a person immediately, even in a large area and/or among a large crowd, and can keep track of a large population simultaneously. As noted, the large bandwidth permits video signals to be integrated with VLCTG's 118 location and movement, providing the opportunity to create audio-video records that are fixed in time and location.

Since location may be relatively precisely discerned, optical transmitter or LEDs may in one embodiment be integrated with projector 128 to display colors, flash, or otherwise generate a visible or audible signal to assist with directional guidance, personnel or intruder identification, energy management, or to facilitate the meeting and connection of individuals. To achieve these objectives, a building needs to be wired only for lights, saving a huge infrastructure of other wires and fixtures.

In some embodiments a data packet 210 may include GPS location header bits that include the packet's destination address 156 in GPS coordinates. The data packet may further include GPS location trailer bits that include the packet's origin address 166 in GPS coordinates. The data packet may further include the address in GPS coordinates of the overhead optical XCVR that most recently transmitted the packet 158 (the last known transmission address, or LTA), as will be described in more detail below. The data packet further includes the data 162 to be transmitted, and may include any other bits of information determined to be necessary for successful transmission of data, such as error detection bits.

Routing data packets from one location to another location can be accomplished using GPS location information tags data packets having a geographic location instead of a cyber location. Such an embodiment eliminates the need for any later geographic location translation because a data packet starts with geographic source and destination information. This simplifies locating the destination of the data packet.

In some embodiments, each data packet is assigned a GPS origin/destination address as it passes through the network infrastructure. The data packet is always searching for the next closest GPS address location. Each stationary (or static) optical XCVR 116, and some dynamic optical XCVRs, within a network will be designated with a GPS location number. As a data packet passes through the network, it is routed by the optical XCVRs, with their internal processors, to the next physically closer optical XCVR within the network. If another optical XCVR is within receiving range, or is connected with another form of communication medium, that optical XCVR receives the data packet. The optical XCVR's internal processor compares its internal GPS location address (ILA) to the data packet's GPS destination address and the optical XCVR's last known transmission address (LTA) stored within the data packet as originating from the individual VLCTG's. If the ILA code is closer to the data packet destination address than the LTA code stored within the data packet, the optical XCVR's processor inserts its ILA code into the data packet as the new LTA code and then repeats transmission of the entire data packet with the updated LTA code.

The network continues this process until the data packet reaches the destination optical XCVR 116 which then transmits the data packet to a pair of VLCTG's 118, at which point the data packet is projected or otherwise communicated to an individual. If a piece of the infrastructure is missing, the packet will be rerouted to the next nearest optical XCVR 116 and continue until it finds the shortest pathway through the network to the destination address.

Furthermore, the data may be communicated in a mesh-fashion, where each XCVR lamp directly communicates with adjacent XCVR lamps and does not require central communications or processing. As a result, with little if any infrastructure required, other than visible light encapsulated communication illumination and appropriate processors and programming for each XCVR lamp, signals may be quickly and directly routed from origin to destination.

This means that each user on the network may declare one or more static positions and also may have a dynamic position. A static address may be a home, an office, etc. When a user leaves their static address location to move through the network infrastructure, the user then becomes dynamic. The network may track the user as the user passes optical XCVRs 116, similar to that of cell phones in relation to cell phone towers, and provide a dynamic address location. If a data packet begins with a destination address that is the user's static address, the network may update the packet with the user's new dynamic address and reroute the packet accordingly, in a scheme similar to that of cellular phones.

In some embodiments, the memory of a user's optical XCVR as integrated or engaged to a VLCTG 118 stores the unique code, the static GPS location address, or both, of another user's optical XCVR in its "phone book", like a cell phone. In at least one embodiment, the optical VLCTG's include a display, also like a cell phone, that allows a first user to find a second user's information and initiate communication with the second user.

In some embodiments, a channel access method like time division multiple access (TDMA) may be used to generate and/or receive pulsed light signals. TDMA splits a signal into timeslots, with each user transmitting only in their allotted time slot. One of ordinary skill will recognize that frequency division multiple access (FDMA), code division multiple access (CDMA), or other channel access method may be used to allow multiple VLCTG's 118 to transmit to a single optical XCVR 116.

In one embodiment the system controller/processor 120 will continuously record and store in real time the received pulsed light communication signals for individual VLCTG's 118 in one or more system databases, one or more subsystem databases, or individuals specific databases, in order to assist in the establishment of normal routine parameters for designated locations or areas within a facility.

Depending upon the communications channel, in some embodiments a variety of client connection devices such as a VLCTG's 118 may be in communication with other VLCTG's 118 utilizing PCMCIA or PC cards, serial ports, parallel ports, SIMM cards, USB connectors, Ethernet cards or connectors, firewire interfaces, Bluetooth compatible devices, infrared/IrDA devices, and other known or similar components.

Driver circuitry and LEDs may pass any signals to the optical link for other devices designed to communicate with VLCTG's 118. Driver circuitry may, in some embodiments, provide appropriate buffering, isolation, modulation or amplification, which will provide appropriate voltage and power to adequately drive LED emitter into producing a visible light transmission. Exemplary of common driver circuits may be operational amplifiers (Op-amps) and transistor amplifiers, though those skilled in the art of signal conditioning will recognize many optional circuits and components which might optionally be used in conjunction with the present invention.

In some embodiments, Visible Light Embedded Communication, or VLEC, as taught herein in association with use of a set of VLCTG's 118 is a secure last mile solution to many diverse communications needs. Last mile refers to the final portion of any communications system, and it is commonly known that the last mile normally demands the vast majority of expense and difficulty in establishing and maintaining a system. Light Emitting Diodes, or LEDs, provide with a set of VLCTG's provide a communications channel while simultaneously affording flexible illumination. Using LEDs to provide visible lighting and to embed communications therein enables the present invention to improve security and provide higher capacity over that known in the prior art. The LED link is untethered and enables a communication link with nomadic devices. The link is untethered in that the user is independent of any one host, and may get the same information at other optical hosts.

In some embodiments, access to a BPL or Broadband over power line system, data is carried as a signal through existing mediums like fiber-optic cable, radio waves, conventional telephone lines, or through the Visible Light Embedded Communications (VLEC) around high-voltage lines. It is then injected into the power grid downstream, onto medium or low voltage wires to businesses and homes. Through advanced electronic equipment, the signal makes its way to Industrial parks and neighborhoods. Customers may then gain access via a VLEC source and ferry the data back and forth to their VLCTG's through computers or through a Client VLEC Dongle or other appropriate adapter.

In at least one embodiment, communication through the use of VLCTG's 118 can further be shared with optically-enabled name tags, telephones, TV and music, Internet, public address, computing devices of all sorts, ranging from hand-held devices such as Personal Digital Assistants (PDAs) to massive mainframe computers, and including Personal Computers (PCs) printers, network storage devices, building maintenance wiring such as thermostats, HVAC systems, fire alarms, motion detectors, cell phones, and any other electrical or electronic apparatus existing or appearing within the room or space, other security and safety devices, appliances, manufacturing machinery, and so forth. Essentially, any device which incorporates or can be made to incorporate sufficient electronic circuitry may communicate with a set of VLCTG's to exchange information at any time. Advantageously, many different conditions or devices may be simultaneously monitored and/or controlled when they are broadcasting information through the preferred network, because they are operating on a wide-bandwidth optical link. This information can be used anywhere on the network, which includes the other rooms or a central server.

The host fixtures may be configured to manage the relationship of VLCTG's 118 associated with this technology. They can also manage peer to peer relationships to provide redundancy or act as part of an infrastructure void of multiple transport medium interconnects. The host may provide intelligent packet analysis whereby false or inadvertent light photons can be discarded. The means of recognition or validation can be provided by multiple checks and verifications. The host fixtures and clients may each be assigned a unique Machine Access Code and Electronic Serial Number. The Machine Access Codes and Electronic Serial Numbers may be assigned by the certified manufacturer's plant and matched against a unique relationship table residing on various certified servers. The VLCTG's may then move about a LAN, an entire office building, a WAN or other network and achieve maximum throughput rates similar to that of the location they originated. An added benefit of the preferred visible light embedded communications comprised by optical communications channel is that, with increased bandwidth, back end software for synchronizing data on PDAs and other mobile devices may be improved by almost 5 fold over RF applications as the transport mediums, avoiding the communications channel bottleneck from RF.

In at least one embodiment, the VLCTG's 118 may be used with many different types of exemplary communications that may be provided incorporating the VLEC technology. Access to the World Wide Web will be enabled through network access to allow users the benefit of web surfing. VLEC technology allows this access to be untethered and nomadic, even though beyond a building or space the network access may be further coupled using conventional cable, Internet Service Provider (ISP) links such as satellite or dial-up, DSL, or other suitable link. AV communications may include various device interface applications such as appliance communications or manipulation and automated manufacturing. HDTV is further contemplated, including mobile HDTV, mobile gaming and interactive TV, but other types of video are additionally contemplated herein, including Slow-Scan TV (SSTV) or other known systems for capturing video information. Telecommunications and personal communications may further be enabled, for exemplary purposes using Voice Over Internet Protocol (VOIP) and mobile voice recognition. While communications are conceived as occurring between a plurality of hosts and individual VLCTG's simultaneously, in many instances one set of VLCTG's 118 will only be coupling one data stream at a time with a host.

In at least one embodiment, location based services may be provided as a use of the Visible Light Communication Transceiver Glasses which may have the added advantage of improved and secure content. One example is a consumer shopping mall where general consumers can walk around and discover the exact location of the goods or services they need. This is accomplished by simply providing a portal for any business to place information about their goods and services within the pulsed light plexus for receipt by a set of VLCTG's. The information may also be incorporated into the BPL infrastructure by means of application controlling devices which link to the overall office or place of business to the VLCTG's In at least one embodiment, the Visible Light Communication Transceiver Glasses are a lens screen-based device which is worn similar to eyewear. In one embodiment, the invention may include a Visible Light Ebedded Communication (VLEC) Transceiver Glasses Interface; for use in association with Visual heads-up Display or Virtual Retinal Display glasses technology in both occluded and transparent models. The Visible Light Communication Transceiver Glasses are preferably safe and include improved information flow, enhanced visual perspective, and communication in daily human activities. The VLCTG's will provide real-time information and two way audio and video communications to the user and offering a greater sense of improved integration to the flow of information.

In some embodiments a single pair of VLCTG's may act as a media center for one person, or a plurality of people. In some embodiments the invention will be integrated with a host network/plexus in Visible Light Embedded Communicaiton (VLEC) technology, and when in use may act as a simple pair of reading glasses, or in some cases a pair of prescription glasses for individuals with corrective lenses.

In some embodiments, the Visible Light Communication Transceiver Glasses (VLCTG) may function as an ocular enhanced Heads-up Display, Wearable Glasses, or Virtual Retina Display glasses.

In some embodiments the VLCTG will provide mobile social networking. In some embodiments the VLCTG will integrate Visible Light Embedded Communications technology. The integration of the Visible Light Embedded Communications with the VLCTG may act as a client device on a host network or IT network/plexus, without the constraints and bottlenecking limitations of RF medium enabled infrastructures. In some embodiments, the VLCTG will eliminate any need for tethering of a wire line Infrastructure to perform multiple duties and having full duplex communication capabilities for the Client. In some embodiments, the VLCTG will provide a user with the ability to share and interact with other client devices in a network/plexus configuration. Sharing and interacting with other client devices may be achieved by providing a higher thru-put path of information back and forth to and from the VLCTG, thus reducing the amount of computing power needed on the local client device itself. In some embodiments the VLCTG are of reduced weight which allows more advanced optical display technology to be incorporated into the design of the device.

In some embodiments the VLCTG may be used in association with Mobile Educational classrooms; Schools and Universities may provide virtual classroom enhancements while optimizing the experience for the student by providing the student with closer interaction ability which in part may be due to the flow of information, and presentation of educational material, as a result of higher bandwidth and greater security.

In some embodiments the VLCTG may be used in Law Enforcement activities. In at least one embodiment, an officer may process live investigation of a suspect without loss of observation of the suspect through use of a pair of Transparent Visible Light Communication Transceiver Glasses. In at least one embodiment an officer may issue audible information requests through voice command technology which is integrated into the overall design of the VLCTG. The Visible Light Communication Transceiver Glasses will transmit the request to the officers' car or as part of a Visible Light Communication Transceiver network/plexus, through another XCVR light within proximity of the officer. During this time the officer may maintain focus on the suspect. Because of the high data bandwidth available through the Visible Light Communication Transceiver network/plexus the requested information is immediately returned to the officer for follow-up. Images and audio content with certain alert features may be communicated to the officer, and provide the officer with necessary time to react accordingly.

In at least one embodiment, fleet management, asset management, and/or personal locator services may be provided through us of a set of VLCTG's, providing greater accuracy, as updates to inventory or asset databases are no longer limited by the computing power of a remote device. In at least one embodiment, the VLCTG improves and expands a users' ability to access and collaborate on increased volume of information about their surroundings. By using the VLCTG in its transparent mode, a user may stay alert to the location of an asset, or keep track of inventory and people, as they move product through out a building. In at least one embodiment, the VLCTG will enable a user to issue search commands to a database, to access business information while moving throughout the facility safely. In at least one embodiment, the use of VLCTG reduces accidents and improves an employee's efficiency by eliminating un-necessary travel of the employee about or extension to a structure.

In at least one embodiment the VLCTG are integrated with a Visible Light Embedded Communications Transceiver Host consisting of LED's transmitting, and Photo Diodes receiving pulsed light communication into and out of, the Local area network/plexus or Wide area network/plexus, forming an Intranet or Extranet. In at least one embodiment, each individual set of VLCTG will have a unique identification symbol, number, letter or character permanently mated to the device, and recorded in an archived database.

An image such as a face or other object may be recorded digitally by a camera 152 in communication with the VLCTG which then converts the image into a Visible Light Embedded Communication packet for transmission through a network/plexus for processing by a server. The processor in turn will communicate the identity and information about an image or object back down stream through the network/plexus for communication by Visible Light Embedded Communication packets for receipt by the optical receptors integrated to VLCTG for receipt of information as transmitted through a projector 128 upon the lense of the VLCTG.

In at least one embodiment cameras 152 may be attached to the VLCTG to aid in the facial or object recognition. In some embodiments, a plurality of cameras may be oriented on a specially designed pair of Visible Light Embedded Communication Transceiver Glasses to provide a separate controlled viewing advantage. In at least one embodiment, this would enhance the mobile peer- to peer- to peer collaboration technology. In some embodiments users of the VLCTG may view scenes or objects from various remote locations through the light-weight cameras 152 as attached to the VLCTG which may provide a high definition video and high definition audio information.

In some embodiments, use of the VLCTG improves mobility, user safety, user response time and enhances the capacity for multiple tasks by multiple users which may be completed across a Visible Light Embedded Communications link. In some embodiments use of the VLCTG will significantly improve activity in a condensed proximity environment like a Classroom setting or business conventions.

In at least one embodiment, with regards to a plexus or network connectivity, a Serial, USB and 1+N-base ethernet, or Fiber optic connection may be in communication with a host Visible Light Embedded Communications fixture system, which in turn may be in communication with a host network processor. In some embodiments the host Visible Light Embedded Communications fixture may replace conventional stationary lighting fixtures to provide optical communication between the host and VLCTG's. In some embodiments, the host Visible Light Embedded Communications fixture may be preferably constructed and arranged to communicate data through pulsed light transmissions.

In at least one embodiment, an LED light and communication device is provided comprising:

Visible light communication transceiver glasses comprising:

a frame comprising at least one lens, at least one light emitting diode, and at least one photodetector, the at least one light emitting diode receiving power from a power source, the frame further comprising at least one processor in communication with the at least one light emitting diode and the at least one photodetector, the processor being constructed and arranged to illuminate the at least one light emitting diode to simultaneously create at least one first light signal, and at least one second light signal, the first light signal being observable to the unaided eyes of an individual and the second light signal not being observable to the unaided eyes of the individual, wherein the second light signal comprises at least one data packet; and at least one projector on said frame, said at least one projector being in communication with said at least one processor for display of at least one image on said at least one lens; a microphone proximate to said frame, said microphone being in communication with said processor; a speaker proximate to said frame, said speaker being in communication with said processor; said processor comprising memory; said processor further comprising voice recognition software; said processor further comprising voice activation software; a camera; the at least one data packet comprising global positioning system (GPS) location information; a switching device in communication with said at least one processor; said switching device is a remote unit which is in communication with said processor through use of another of said second light signals; the Visible Light Communication Transceiver Glasses include a unique identifier; and the unique identifier is stored in non-volatile memory.

This completes the description of the embodiments of the invention. Those skilled in the art may recognize other equivalents to the specific embodiment described herein which equivalents are intended to be encompassed by the claims attached hereto.

What is claimed is:

1. An LED light and communication device comprising:
Visible light communication transceiver glasses comprising:
a frame comprising at least one lens, at least one light emitting diode, and at least one photodetector, said at least one photodetector constructed and arranged for receipt of illumination comprising at least one pulsed light communication signal, said illumination being observable to the unaided eyes of an individual, said at least one pulsed light communication signal comprising a plurality of rapid flashes of visible light, said rapid flashes of visible light being at a frequency which is not observable to the unaided eyes of the individual, wherein said rapid flashes of visible light comprise data or information, the at least one light emitting diode receiving power from a power source, the frame further comprising at least one processor in communication with the at least one light emitting diode and the at least one photodetector, the processor being constructed and arranged to process said at least one pulsed light communication signal and communicate at least one image or said information to at least one projector on said frame, the processor being further constructed and arranged to illuminate the at least one light emitting diode to transmit at least one visible light signal comprising at least one communication signal embedded within the at least one visible light signal, the visible light signal comprising a plurality of rapid flashes of visible light, said rapid flashes of visible light being at a frequency which is not observable to the unaided eyes of the individual, wherein the at least one communication signal comprises at least one data packet; and
wherein said at least one projector displays said at least one image or said information on said at least one lens.

2. The LED light and communication device of claim 1, further comprising a microphone proximate to said frame, said microphone being in communication with said processor.

3. The LED light and communication device of claim 2, further comprising a speaker proximate to said frame, said speaker being in communication with said processor.

4. The LED light and communication device of claim 3, said processor comprising memory.

5. The LED light and communication device of claim 4, said processor further comprising voice recognition software.

6. The LED light and communication device of claim 4, said processor further comprising voice activation software.

7. The LED light and communication device of claim 4, further comprising a camera.

8. The LED light and communication device of claim 1, further comprising at least one unique identifier comprising global positioning system (GPS) location information.

9. The LED light and communication device of claim 4, further comprising a switching device in communication with said at least one processor.

10. The LED light and communication device of claim 9, wherein said switching device is a remote unit which is in communication with said processor.

11. The LED light and communication devise of claim 10, wherein the Visible Light Communication Transceiver Glasses include a unique identifier.

12. The LED light and communication device of claim 4, further comprising non-volatile memory, wherein the unique identifier is stored in non-volatile memory.

13. An LED light and communication device comprising:
Visible light communication transceiver glasses comprising:
a frame comprising at least one lens, at least one light emitting diode, and at least one photodetector, said at least one photodetector constructed and arranged for receipt of at least one pulsed light communication signal, said at least one pulsed light communication signal comprising visible light, said at least one pulsed light communication signal comprising embedded information or data, the at least one light emitting diode receiving power from a power source, the frame further comprising at least one processor in communication with the at least one light emitting diode and the at least one photodetector, the processor being constructed and arranged to illuminate the at least one light emitting diode to generate at least one visible light communication signal comprising visible light, said at least one visible light communication signal comprising at least one data packet or information packet embedded in said visible light, said at least one pulsed light communication signal or said at least one visible light signal comprising a unique identifier; and
at least one projector on said frame, said at least one projector being in communication with said at least one processor for display of at least one image on said at least one lens.

14. An LED light and communication device comprising:
Visible light communication transceiver glasses comprising:
a frame comprising at least one lens, at least one light emitting diode, and at least one photodetector, said at least one photodetector constructed and arranged for receipt of illumination comprising at least one pulsed light communication signal, said illumination being observable to the unaided eyes of an individual, said at least one pulsed light communication signal comprising a plurality of rapid flashes of visible light, said rapid flashes of visible light being at a frequency which is not observable to the unaided eyes of the individual, wherein said rapid flashes of visible light comprise data or information, the at least one light emitting diode receiving power from a power source, the frame further comprising at least one processor in communication with the at least one light emitting diode and the at least one photodetector, the processor being constructed and arranged to process said at least one pulsed light communication signal and communicate at least one image or said information to at least one projector on said frame, the processor being further constructed and arranged to illuminate the at least one light emitting diode to transmit at least one visible light signal comprising at least one communication signal embedded within the at least one visible light signal, the visible light signal comprising a plurality of rapid flashes of visible light, said rapid flashes of visible light being at a frequency which is not observable to the unaided eyes of the individual, wherein the at least one communication signal comprises at least one data packet, said at least one pulsed light communication signal or said at least one visible light signal comprising a unique identifier; and
wherein said at least one projector displays said at least one image or said information on said at least one lens.

* * * * *